US010249879B2

(12) United States Patent
Yamamoto

(10) Patent No.: US 10,249,879 B2
(45) Date of Patent: Apr. 2, 2019

(54) BINDER COMPOSITION FOR SECONDARY BATTERY ELECTRODE-USE, SLURRY COMPOSITION FOR SECONDARY BATTERY ELECTRODE-USE, ELECTRODE FOR SECONDARY BATTERY-USE AND PRODUCTION METHOD THEREFOR, AND SECONDARY BATTERY

(71) Applicant: ZEON CORPORATION, Chiyoda-ku, Tokyo (JP)

(72) Inventor: Norikazu Yamamoto, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 95 days.

(21) Appl. No.: 15/306,770

(22) PCT Filed: Apr. 27, 2015

(86) PCT No.: PCT/JP2015/002270
§ 371 (c)(1),
(2) Date: Oct. 26, 2016

(87) PCT Pub. No.: WO2015/174036
PCT Pub. Date: Nov. 19, 2015

(65) Prior Publication Data

US 2017/0054152 A1 Feb. 23, 2017

(30) Foreign Application Priority Data

May 14, 2014 (JP) ................................ 2014-100806

(51) Int. Cl.
*H01M 4/62* (2006.01)
*H01M 4/13* (2010.01)
*H01M 4/04* (2006.01)
*H01M 10/0525* (2010.01)

(52) U.S. Cl.
CPC ......... *H01M 4/622* (2013.01); *H01M 4/0404* (2013.01); *H01M 4/13* (2013.01); *H01M 4/62* (2013.01); *H01M 4/628* (2013.01); *H01M 10/0525* (2013.01)

(58) Field of Classification Search
CPC .. H01M 4/62; H01M 10/0525; H01M 4/0404; H01M 4/13; H01M 4/622
See application file for complete search history.

(56) References Cited

U.S. PATENT DOCUMENTS

| | | | | |
|---|---|---|---|---|
| 2008/0011986 | A1* | 1/2008 | Yamakawa | H01G 11/28 252/500 |
| 2016/0141581 | A1 | 5/2016 | Sasaki et al. | |

FOREIGN PATENT DOCUMENTS

| | | | | |
|---|---|---|---|---|
| CN | 105324868 | A | | 2/2016 |
| EP | 2680349 | A1 | | 1/2014 |
| JP | 2000/067871 | M | * | 3/2000 |
| JP | 2010040228 | A | | 2/2010 |
| JP | 2012182012 | | * | 9/2012 |
| JP | 2012182012 | A | | 9/2012 |
| JP | 2012204303 | A | | 10/2012 |
| WO | WO 2012/026462 | | * | 3/2012 |
| WO | 2012115096 | A1 | | 8/2012 |

OTHER PUBLICATIONS

Nov. 15, 2016, International Preliminary Report on Patentability issued in the International Patent Application No. PCT/JP2015/002270.

* cited by examiner

*Primary Examiner* — Alexander Usyatinsky
(74) *Attorney, Agent, or Firm* — Kenja IP Law PC

(57) ABSTRACT

Provided is a binder composition for secondary battery electrode-use that can be used to form a low-resistance electrode mixed material layer that enables a secondary battery to exhibit good low-temperature output characteristics and inhibits deposition of lithium dendrites and the like, and that can favorably suppress electrode expansion that is associated with repeated charging and discharging. The binder composition for secondary battery electrode-use contains: a first particulate polymer having a degree of swelling in electrolyte solution of at least 450 mass % and no greater than 700 mass %; a second particulate polymer having a degree of swelling in electrolyte solution of at least 300 mass % and no greater than 400 mass %; and water.

11 Claims, No Drawings

BINDER COMPOSITION FOR SECONDARY BATTERY ELECTRODE-USE, SLURRY COMPOSITION FOR SECONDARY BATTERY ELECTRODE-USE, ELECTRODE FOR SECONDARY BATTERY-USE AND PRODUCTION METHOD THEREFOR, AND SECONDARY BATTERY

TECHNICAL FIELD

The present disclosure relates to a binder composition for secondary battery electrode-use, a slurry composition for secondary battery electrode-use, an electrode for secondary battery-use, a method for producing an electrode for secondary battery-use, and a secondary battery.

BACKGROUND

Secondary batteries such as lithium ion secondary batteries have characteristics such as compact size, light weight, high energy-density, and the ability to be repeatedly charged and discharged, and are used in a wide variety of applications. Consequently, in recent years, studies have been made to improve battery members such as electrodes for the purpose of achieving even higher secondary battery performance.

An electrode for a secondary battery, such as a lithium ion secondary battery, generally includes a current collector and an electrode mixed material layer formed on the current collector. The electrode mixed material layer is formed, for example, by applying, onto the current collector, a slurry composition in which an electrode active material, a binder composition containing a binding material, and so forth are dispersed in a dispersion medium, and drying the applied slurry composition.

In recent years, there have been attempts to improve binder compositions used in the formation of electrode mixed material layers in order to further improve secondary battery performance. In one specific example, it has been proposed that binding capacity between particles of an electrode active material, or between the electrode active material and a current collector, can be increased and secondary battery performance can be improved through use of a binder composition that contains two types of particulate polymers of differing particle diameters as a binding material.

More specifically, PTL 1, for example, proposes a technique that increases binding capacity between particles of an electrode active material, or between the electrode active material and a current collector, and that improves secondary battery cycle characteristics through use of a binding material including first rubbery resin particles composed of styrene-butadiene rubber particles having an average particle diameter of at least 130 nm and second rubbery resin particles composed of nitrile rubber particles having an average particle diameter of less than 130 nm.

In another example, PTL 2 proposes a technique that improves pressing processability of an electrode for secondary battery-use while increasing binding capacity between an electrode active material and a current collector through use of a binding material including a polymer latex (a) having a number average particle diameter of from 80 nm to 120 nm, a glass transition temperature of from 5° C. to 50° C., and a toluene gel content of at least 70%, and a polymer latex (b) having a number average particle diameter of from 150 nm to 280 nm, a glass transition temperature of from −50° C. to 0° C., and a toluene gel content of at least 70%.

CITATION LIST

Patent Literature

PTL 1: JP 2012-182012 A
PTL 2: JP 2010-40228 A

SUMMARY

Technical Problem

However, a conventional binder composition including a binding material such as described above suffers from a problem in terms that resistance of an electrode mixed material layer formed using the binder composition tends to be high, which leads to poorer secondary battery low-temperature output characteristics. Another problem is that in a situation in which the binder composition is used, for example, to form a negative electrode of a lithium ion secondary battery, deposition of lithium dendrites on the surface of the negative electrode tends to increase. The conventional binder composition described above also suffers from a problem of being unable to sufficiently suppress electrode expansion that is associated with repeated charging and discharging.

It should be noted that the aforementioned problems have a particularly high tendency to occur if drying is performed under high-temperature conditions (for example, a temperature of 70° C. or higher) after a slurry composition for electrode-use that contains the binder composition and an electrode active material has been applied onto a current collector.

Therefore, an objective of the present disclosure is to provide a binder composition for secondary battery electrode-use and a slurry composition for secondary battery electrode-use that can be used to form a low-resistance electrode mixed material layer that enables a secondary battery to exhibit good low-temperature output characteristics and inhibits deposition of lithium dendrites and the like, and that can favorably suppress electrode expansion that is associated with repeated charging and discharging.

Another objective of the present disclosure is to provide an electrode for secondary battery-use, and also a production method therefor, that enables a secondary battery to exhibit good low-temperature output characteristics, inhibits deposition of lithium dendrites and the like, and has a low tendency to expand, even when charging and discharging are performed repeatedly.

Yet another objective of the present disclosure is to provide a secondary battery that has excellent low-temperature output characteristics, and in which deposition of lithium dendrites and the like on an electrode and electrode expansion have a low tendency to occur.

Solution to Problem

The inventor conducted diligent investigation with the aim of solving the problems described above. As a result, the inventor made a new discovery that through use of a binding material that includes a first particulate polymer having a specific degree of swelling in electrolyte solution and a second particulate polymer having a specific degree of swelling in electrolyte solution, an electrode mixed material layer having low resistance can be formed, and electrode expansion that is associated with repeated charging and discharging can be favorably suppressed. This discovery led to the present disclosure.

Specifically, in order to advantageously solve the problems described above, a presently disclosed binder composition for secondary battery electrode-use comprises a particulate binding material and water, wherein the particulate binding material includes a first particulate polymer having a degree of swelling in electrolyte solution of at least 450 mass % and no greater than 700 mass % and a second particulate polymer having a degree of swelling in electrolyte solution of at least 300 mass % and no greater than 400 mass %. Through use of the binder composition containing the particulate binding material that includes the first particulate polymer having a degree of swelling in electrolyte solution of at least 450 mass % and no greater than 700 mass % and the second particulate polymer having a degree of swelling in electrolyte solution of at least 300 mass % and no greater than 400 mass %, it is possible to form a low-resistance electrode mixed material layer that enables a secondary battery to exhibit good low-temperature output characteristics and inhibits deposition of lithium dendrites and the like. Moreover, it is also possible to favorably suppress electrode expansion that is associated with repeated charging and discharging.

In the presently disclosed binder composition for secondary battery electrode-use, a ratio of a number average particle diameter of the second particulate polymer relative to a number average particle diameter of the first particulate polymer is preferably at least 1.8 and no greater than 4.4. One reason for this is that electrode mixed material layer resistance can be further reduced and a decrease in electrode strength can be inhibited as a result of the ratio of the number average particle diameter of the first particulate polymer and the number average particle diameter of the second particulate polymer (number average particle diameter of second particulate polymer/number average particle diameter of first particulate polymer) being in the aforementioned range.

In the presently disclosed binder composition for secondary battery electrode-use, the first particulate polymer is preferably contained in an amount, expressed as a solid content-converted value, of at least 70 parts by mass and no greater than 95 parts by mass relative to a total of 100 parts by mass of the first particulate polymer and the second particulate polymer. One reason for this is that electrode expansion can be sufficiently suppressed while sufficiently reducing electrode mixed material layer resistance, and stability of the binder composition can be increased as a result of the amounts of the first particulate polymer and the second particulate polymer being in the aforementioned range.

In the presently disclosed binder composition for secondary battery electrode-use, the particulate binding material preferably further includes a third particulate polymer having a degree of swelling in electrolyte solution of at least 130 mass % and no greater than 250 mass %. One reason for this is that electrode expansion can be further suppressed while sufficiently reducing electrode mixed material layer resistance, and peel strength of an electrode for secondary battery-use can be increased as a result of the third particulate polymer that has a degree of swelling in electrolyte solution of at least 130 mass % and no greater than 250 mass % being included in addition to the first particulate polymer and the second particulate polymer.

In the presently disclosed binder composition for secondary battery electrode-use, the third particulate polymer preferably has a larger number average particle diameter than the first particulate polymer and preferably has a smaller number average particle diameter than the second particulate polymer. One reason for this is that electrode expansion can be further suppressed while sufficiently reducing electrode mixed material layer resistance, and peel strength of an electrode for secondary battery-use can be further increased as a result of the number average particle diameter of the third particulate polymer being larger than the number average particle diameter of the first particulate polymer and smaller than the number average particle diameter of the second particulate polymer.

In the presently disclosed binder composition for secondary battery electrode-use, the first particulate polymer and the second particulate polymer are preferably contained in a total amount, expressed as a solid content-converted value, of at least 30 parts by mass and no greater than 70 parts by mass per 100 parts by mass of the particulate binding material, and the third particulate polymer is preferably contained in an amount, expressed as a solid content-converted value, of at least 30 parts by mass and no greater than 70 parts by mass per 100 parts by mass of the particulate binding material. One reason for this is that a favorable balance of suppressing electrode expansion, improving peel strength of an electrode for secondary battery-use, and sufficiently reducing electrode mixed material layer resistance can be achieved as a result of the amounts of the first particulate polymer, the second particulate polymer, and the third particulate polymer in the particulate binding material being in the aforementioned ranges.

Moreover, in order to advantageously solve the problems described above, a presently disclosed slurry composition for secondary battery electrode-use comprises any one of the binder compositions for secondary battery electrode-use described above and an electrode active material. Through use of any of the previously described binder compositions for secondary battery electrode-use, it is possible to form a low-resistance electrode mixed material layer that enables a secondary battery to exhibit good low-temperature output characteristics and that can inhibit deposition of lithium dendrites and the like. It is also possible to favorably suppress electrode expansion caused by repeated charging and discharging.

Furthermore, in order to advantageously solve the problems described above, a presently disclosed electrode for secondary battery-use comprises an electrode mixed material layer that is obtainable using the slurry composition for secondary battery electrode-use described above. Through use of the previously described slurry composition for secondary battery electrode-use to form the electrode mixed material layer, it is possible to enable a secondary battery to exhibit good low-temperature output characteristics and inhibit deposition of lithium dendrites and the like. It is also possible to favorably suppress electrode expansion that is associated with repeated charging and discharging.

Also, in order to advantageously solve the problems described above, a presently disclosed method for producing an electrode for secondary battery-use comprises: applying the slurry composition for secondary battery electrode-use described above onto a current collector; and drying the slurry composition for secondary battery electrode-use that has been applied onto the current collector to form an electrode mixed material layer on the current collector, wherein the drying of the slurry composition for secondary battery electrode-use is performed at a temperature of 70° C. or higher. Producibility of an electrode for secondary battery-use can be improved by performing the drying of the applied slurry composition for electrode-use at a high temperature of 70° C. or higher. Moreover, through use of the previously described slurry composition for electrode-use, it is possible to sufficiently reduce electrode mixed material layer resistance and suppress electrode expansion caused by repeated charging and discharging, even in a situation in which a high drying temperature is adopted in order to improve producibility of the electrode for secondary battery-use.

Furthermore, in order to advantageously solve the problems described above, a presently disclosed secondary battery comprises a positive electrode, a negative electrode, a separator, and an electrolyte solution, wherein either or both of the positive electrode and the negative electrode are the electrode for secondary battery-use described above. As a result of either or both of the positive electrode and the negative electrode being the previously described electrode for secondary battery-use, it is possible to provide the secondary battery with excellent low-temperature output characteristics, and also to suppress electrode expansion and inhibit deposition of lithium dendrites and the like on an electrode.

Advantageous Effect

Through the presently disclosed binder composition for secondary battery electrode-use and the presently disclosed slurry composition for secondary battery electrode-use, it is possible to form a low-resistance electrode mixed material layer that enables a secondary battery to exhibit good low-temperature output characteristics and that inhibits deposition of lithium dendrites and the like, and also to favorably suppress electrode expansion that is associated with repeated charging and discharging.

Moreover, through the presently disclosed electrode for secondary battery-use and the presently disclosed method for producing an electrode for secondary battery-use, it is possible to provide an electrode that enables a secondary battery to exhibit good low-temperature output characteristics, inhibits deposition of lithium dendrites and the like, and has a low tendency to expand, even when charging and discharging are performed repeatedly.

Furthermore, the presently disclosed secondary battery has excellent low-temperature output characteristics and has a low tendency to experience electrode expansion or deposition of lithium dendrites and the like.

DETAILED DESCRIPTION

The following provides a detailed description of embodiments of the present disclosure.

Herein, a presently disclosed binder composition for secondary battery electrode-use is used in production of a slurry composition for secondary battery electrode-use. The slurry composition for secondary battery electrode-use that is produced using the presently disclosed binder composition for secondary battery electrode-use can be used in formation of an electrode for a secondary battery. Moreover, a presently disclosed electrode for secondary battery-use is for example produced by a presently disclosed method for producing an electrode for secondary battery-use in which the presently disclosed slurry composition for secondary battery electrode-use is used. Furthermore, a presently disclosed secondary battery includes the presently disclosed electrode for secondary battery-use.

(Binder Composition for Secondary Battery Electrode-Use)

The presently disclosed binder composition for secondary battery electrode-use is an aqueous binder composition that has an aqueous medium as a dispersion medium and that contains a particulate binding material and water. A feature of the presently disclosed binder composition for secondary battery electrode-use is that particulate polymers described below in (I) and (II) are used in combination as the particulate binding material.

(I) A first particulate polymer having a degree of swelling in electrolyte solution of at least 450 mass % and no greater than 700 mass %

(II) A second particulate polymer having a degree of swelling in electrolyte solution of at least 300 mass % and no greater than 400 mass %

The "degree of swelling in electrolyte solution" of a particulate polymer described herein can be measured by a method described in the examples section of the present specification.

<Particulate Binding Material>

The particulate binding material is a component for holding components contained in an electrode mixed material layer of an electrode for secondary battery-use that is produced through formation of the electrode mixed material layer on a current collector using a slurry composition for secondary battery electrode-use that contains the presently disclosed binder composition and an electrode active material. As a result, the particulate binding material ensures that the aforementioned components do not become detached from the electrode mixed material layer. In general, when a particulate binding material in an electrode mixed material layer is immersed in an electrolyte solution, the particulate binding material remains in particulate form while absorbing the electrolyte solution and swelling so as to bind particles of the electrode active material to one another, or bind the electrode active material to the current collector, and thereby prevent the electrode active material from becoming detached from the current collector. The particulate binding material also fulfills a function of maintaining strength of the electrode mixed material layer by binding particles other than the electrode active material that are contained in the electrode mixed material layer.

A feature of the presently disclosed binder composition is that the first particulate polymer and the second particulate polymer are used in combination as the particulate binding material in order that, in an electrode formed using the binder composition, electrode mixed material layer resistance is reduced and expansion that is associated with repeated charging and discharging is suppressed. However, it should be noted that the presently disclosed binder composition may contain other particulate polymers, in addition to the first particulate polymer and the second particulate polymer, as the particulate binding material.

[First Particulate Polymer]

The first particulate polymer is required to have a degree of swelling in electrolyte solution of at least 450 mass % and no greater than 700 mass %. In a situation in which the presently disclosed binder composition is used to form an electrode, the first particulate polymer exhibits a function of ensuring ion conductivity within an electrode mixed material layer when the electrode is immersed in an electrolyte solution, and thereby reducing resistance of the electrode mixed material layer, while also suppressing electrode expansion that is associated with charging and discharging.

—Degree of Swelling in Electrolyte Solution—

The degree of swelling in electrolyte solution of the first particulate polymer is required to be at least 450 mass % and no greater than 700 mass %, is preferably at least 500 mass % and more preferably at least 550 mass %, and is preferably no greater than 660 mass % and more preferably no greater than 630 mass %. One reason for this is that electrode mixed material layer resistance cannot be sufficiently reduced if the degree of swelling in electrolyte solution of the first particulate polymer is less than 450 mass %. Moreover, the situation described above results in a decrease in low-temperature output characteristics of a secondary battery produced using this binder composition and also results in insufficient inhibition of deposition of lithium in the form of dendrites (lithium dendrites) when such a binder composition is used, for example, to form a negative electrode of a lithium ion secondary battery. Another reason is that electrode expansion that is associated with charging and discharging cannot be sufficiently suppressed if the degree of swelling in electrolyte solution of the first particulate polymer is greater than 700 mass %, even if the first particulate polymer is used in combination with the second particulate polymer described in detail further below.

The degree of swelling in electrolyte solution of the first particulate polymer can be adjusted, without any specific limitations, by changing the types of monomers used to form the first particulate polymer, the amounts of these monomers, and so forth. As one specific example, the degree of swelling in electrolyte solution can be increased by increasing the amount of a vinyl cyanide-based monomer or a (meth)acrylic acid ester monomer that is used.

In the present description, "(meth)acrylic acid" is used to indicate "acrylic acid" and/or "methacrylic acid".

—Number Average Particle Diameter—

The number average particle diameter of the first particulate polymer is preferably at least 80 nm, and is also preferably no greater than 130 nm. One reason for this is that suppression of electrode expansion and reduction of electrode mixed material layer resistance can be favorably achieved as a result of the number average particle diameter being in the aforementioned range.

The "number average particle diameter" of a particulate polymer can be easily measured by laser diffraction scattering.

The number average particle diameter of the first particulate polymer can be adjusted, without any specific limitations, by changing polymerization conditions of the first particulate polymer (for example, the amount of emulsifier or seed particles that is used).

—Gel Content—

The gel content of the first particulate polymer is preferably at least 80 mass %, more preferably at least 81 mass %, further preferably at least 82 mass %, and particularly preferably at least 85 mass %, and is preferably no greater than 98 mass %, more preferably no greater than 95 mass %, and further preferably no greater than 88 mass %. One reason for this is that in a situation in which the binder composition is used to produce an electrode, close adherence between a current collector and an electrode mixed material layer can be increased and peel strength of the electrode can be improved as a result of the gel content of the first particulate polymer being at least 80 mass %. Another reason is that electrode mixed material layer resistance can be favorably reduced as a result of the gel content of the first particulate polymer being no greater than 98 mass %.

The "gel content" of a particulate polymer can be measured by a method described in the examples section of the present specification.

The gel content of the first particulate polymer can be adjusted, without any specific limitations, by changing polymerization conditions of the first particulate polymer (for example, the polymerization temperature, the type of polymerization initiator, the amount of chain transfer agent that is used, or the conversion rate (monomer consumption amount) at the end of the reaction). As one specific example, the gel content can be increased by reducing the amount of a chain transfer agent that is used in polymerization and can be reduced by increasing the amount of the chain transfer agent that is used in polymerization.

—Polymer Composition—

The first particulate polymer may be composed of any polymer that has the properties described above and that exists in a particulate state in an aqueous medium used as a dispersion medium. Specifically, the polymer composing the first particulate polymer may for example be, but is not specifically limited to, a polymer including a copolymer (A) that contains an aliphatic conjugated diene monomer unit and an aromatic vinyl monomer unit, and may more preferably be a composite polymer (heterophase structure) including the copolymer (A) that contains the aliphatic conjugated diene monomer unit and the aromatic vinyl monomer unit, and also including another polymer. The following describes, as one example of a polymer that may compose the first particulate polymer, a composite polymer (heterophase structure) including the copolymer (A) that contains the aliphatic conjugated diene monomer unit and the aromatic vinyl monomer unit, and also including another polymer.

The phrase "containing a monomer unit" as used herein means that "a polymer obtained with a monomer contains a structural unit derived from the monomer".

Herein, the composite polymer that can be used as the first particulate polymer can be easily produced by a method in which after at least one type of monomer component has been polymerized according to a standard method, at least one other type of monomer component is polymerized according to a standard method (i.e., a two-stage polymerization method). A particle composed of the composite polymer is a heterophase structure in which different polymer portions are present within the particle.

In this context, a heterophase structure refers to a single particle formed by physical or chemical bonding of two or more different polymers, and not to a particle having a monophase structure formed by a single polymer such as a block polymer. Specific examples of the heterophase structure include a core-shell structure that is a spherical particle in which the center and the outer shell are formed from different polymers; a side-by-side structure in which two or more polymers are adjacent to each other; a snowman structure in which a portion of the polymer at the center in a core-shell structure is exposed from the outer shell; an octopus ocellatus structure in which a different type of polymer particle is embedded in the surface of a spherical polymer particle, yielding an integrated structure; and the like. A core-shell structure is preferable.

Specifically, the composite polymer may for example be produced by polymerizing a monomer composition that contains at least an aliphatic conjugated diene monomer by a standard method and then polymerizing the copolymer (A) containing the aliphatic conjugated diene monomer unit and the aromatic vinyl monomer unit by a standard method.

The monomer composition containing at least an aliphatic conjugated diene monomer may for example be a composition that does not contain an aromatic vinyl monomer or a composition that has a smaller content of an aromatic vinyl monomer than a monomer composition used to produce the copolymer (A) containing the aliphatic conjugated diene monomer unit and the aromatic vinyl monomer unit.

Examples of monomers other than aliphatic conjugated diene monomers that may be contained in the monomer composition containing at least an aliphatic conjugated diene monomer include a vinyl cyanide-based monomer.

Examples of aliphatic conjugated diene monomers that can be contained in the monomer composition containing at least an aliphatic conjugated diene monomer include, but are not specifically limited to, 1,3-butadiene, 2-methyl-1,3-butadiene, 2,3-dimethyl-1,3-butadiene, 2-chloro-1,3-butadiene, substituted linear conjugated pentadienes, and substituted and side-chain conjugated hexadienes. Of these aliphatic conjugated diene monomers, 1,3-butadiene is preferable. One type of aliphatic conjugated diene monomer may be used individually, or two or more types of aliphatic conjugated diene monomers may be used in combination in a freely selected ratio.

Examples of the vinyl cyanide-based monomer include, but are not specifically limited to, acrylonitrile, methacrylonitrile, α-chloroacrylonitrile, and α-ethylacrylonitrile. Of these vinyl cyanide-based monomers, acrylonitrile and methacrylonitrile are preferable. One type of vinyl cyanide-based monomer may be used individually, or two or more types of vinyl cyanide-based monomers may be used in combination in a freely selected ratio.

Examples of aliphatic conjugated diene monomers that can be used to form the aliphatic conjugated diene monomer unit in the copolymer (A) include, but are not specifically limited to, the same aliphatic conjugated diene monomers as described above. Of these aliphatic conjugated diene monomers, 1,3-butadiene is preferable. One type of aliphatic conjugated diene monomer may be used individually, or two or more types of aliphatic conjugated diene monomers may be used in combination in a freely selected ratio.

Aromatic vinyl monomers that can be used to form the aromatic vinyl monomer unit in the copolymer (A) include, but are not specifically limited to, styrene, α-methylstyrene, vinyltoluene, and divinylbenzene. Of these aromatic vinyl monomers, styrene is preferable. One type of aromatic vinyl monomer may be used individually, or two or more types of aromatic vinyl monomers may be used in combination in a freely selected ratio.

The copolymer (A) may contain monomer units other than the aliphatic conjugated diene monomer unit and the aromatic vinyl monomer unit described above.

Specifically, in addition to the aliphatic conjugated diene monomer unit and the aromatic vinyl monomer unit, the copolymer (A) may further contain an ethylenically unsaturated carboxylic acid monomer unit, a vinyl cyanide-based monomer unit, a (meth)acrylic acid ester monomer unit, a hydroxyalkyl group-containing unsaturated monomer unit, an unsaturated carboxylic acid amide monomer unit, or the like. Of these other monomer units, it is preferable that the copolymer (A) further contains an ethylenically unsaturated carboxylic acid monomer unit, a vinyl cyanide-based monomer unit, and a (meth)acrylic acid ester monomer unit in addition to the aliphatic conjugated diene monomer unit and the aromatic vinyl monomer unit.

Examples of ethylenically unsaturated carboxylic acid monomers that can be used to form an ethylenically unsaturated carboxylic acid monomer unit in the copolymer (A) include monocarboxylic acids and dicarboxylic acids such as acrylic acid, methacrylic acid, crotonic acid, maleic acid, fumaric acid, and itaconic acid, and anhydrides thereof. Of these ethylenically unsaturated carboxylic acid monomers, acrylic acid, methacrylic acid, and itaconic acid are preferable. One type of ethylenically unsaturated carboxylic acid monomer may be used individually, or two or more types of ethylenically unsaturated carboxylic acid monomers may be used in combination in a freely selected ratio.

Examples of vinyl cyanide-based monomers that can be used to form a vinyl cyanide-based monomer unit in the copolymer (A) include, but are not specifically limited to, the same vinyl cyanide-based monomers as described above. Of these vinyl cyanide-based monomers, acrylonitrile and methacrylonitrile are preferable. One type of vinyl cyanide-based monomer may be used individually, or two or more types of vinyl cyanide-based monomers may be used in combination in a freely selected ratio.

Examples of (meth)acrylic acid ester monomers that can be used to form a (meth)acrylic acid ester monomer unit in the copolymer (A) include alkyl acrylates such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and alkyl methacrylates such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. One of these (meth)acrylic acid ester monomers may be used individually, or two or more of these (meth)acrylic acid ester monomers may be used in combination in a freely selected ratio.

Examples of hydroxyalkyl group-containing unsaturated monomers that can be used to form a hydroxyalkyl group-containing unsaturated monomer unit in the copolymer (A) include β-hydroxyethyl acrylate, β-hydroxyethyl methacrylate, hydroxypropyl acrylate, hydroxypropyl methacrylate, hydroxybutyl acrylate, hydroxybutyl methacrylate, 3-chloro-2-hydroxypropyl methacrylate, di(ethylene glycol) maleate, di(ethylene glycol) itaconate, 2-hydroxyethyl maleate, bis(2-hydroxyethyl) maleate, and 2-hydroxyethyl methyl fumarate. Of these hydroxyalkyl group-containing unsaturated monomers, β-hydroxyethyl acrylate is preferable. One of these hydroxyalkyl group-containing unsaturated monomers may be used individually, or two or more of these hydroxyalkyl group-containing unsaturated monomers may be used in combination in a freely selected ratio.

Examples of unsaturated carboxylic acid amide monomers that can be used to form an unsaturated carboxylic acid amide monomer unit in the copolymer (A) include acrylamide, methacrylamide, N-methylolacrylamide, N-methylolmethacrylamide, and N,N-dimethylacrylamide. Of these unsaturated carboxylic acid amide monomers, acrylamide and methacrylamide are preferable. One of these unsaturated carboxylic acid amide monomers may be used individually, or two or more of these unsaturated carboxylic acid amide monomers may be used in combination in a freely selected ratio.

Polymerization of the monomer composition containing the monomers described above can be carried out in an aqueous solvent. The percentage content of each of the monomers in the monomer composition is normally the same as the percentage content of the corresponding repeat unit in the target polymer.

No specific limitations are placed on the aqueous solvent other than being a solvent in which the prepared polymer can be dispersed in a particulate state. The aqueous solvent is normally selected from aqueous solvents having a boiling point at standard pressure of at least 80° C. and preferably at least 100° C., and of no higher than 350° C. and preferably no higher than 300° C.

Specific examples of aqueous solvents that can be used include water; ketones such as diacetone alcohol and γ-butyrolactone; alcohols such as ethyl alcohol, isopropyl alcohol, and normal-propyl alcohol; glycol ethers such as propylene glycol monomethyl ether, methyl cellosolve, ethyl cellosolve, ethylene glycol tertiary-butyl ether, butyl cellosolve, 3-methoxy-3-methyl-1-butanol, ethylene glycol monopropyl ether, diethylene glycol monobutyl ether, triethylene glycol monobutyl ether, and dipropylene glycol monomethyl ether; and ethers such as 1,3-dioxolane, 1,4-dioxolane, and tetrahydrofuran. Of these aqueous solvents, water is particularly preferable since it is non-flammable and a dispersion of polymer particles is easily obtainable. Water may be used as a main solvent with another of the above aqueous solvents other than water being mixed in to the extent that the dispersed state of the polymer particles can still be ensured.

The method of polymerization is not specifically limited and may for example be solution polymerization, suspension polymerization, bulk polymerization, or emulsion polymerization. Also, the polymerization reaction may for example be ionic polymerization, radical polymerization, or living radical polymerization. Emulsion polymerization is particularly preferable from the perspective of production efficiency because a high molecular weight can be easily achieved and because re-dispersion treatment is unnecessary since the resulting polymer is already in a dispersed state in water and can, therefore, be used as-produced in production of the binder composition. The emulsion polymerization can be performed by a standard method.

An emulsifier, a dispersant, a polymerization initiator, a polymerization aid, a chain transfer agent, or the like that is used in the polymerization and the amount thereof may be the same as commonly used. In the polymerization, seed particles may be used to perform seed polymerization. The polymerization conditions may also be selected freely in accordance with the polymerization method, type of polymerization initiator, and the like.

The pH of the aqueous dispersion of the polymer particles obtained by the aforementioned polymerization method may be adjusted to within a normal range of from pH 5 to pH 10 or a preferable range of from pH 5 to pH 9 using a basic aqueous solution containing, for example, a hydroxide of an alkali metal (for example, Li, Na, K, Rb, or Cs), ammonia, an inorganic ammonium compound (for example, $NH_4Cl$), or an organic amine compound (for example, ethanolamine or diethylamine). Of these examples, pH adjustment using an alkali metal hydroxide is preferable since such pH adjustment improves the binding capacity between a current collector and an electrode active material (i.e., peel strength).

[Second Particulate Polymer]

The second particulate polymer is required to have a degree of swelling in electrolyte solution of at least 300 mass % and no greater than 400 mass %. In a situation in which the presently disclosed binder composition is used to form an electrode, the second particulate polymer exhibits a function of ensuring ion conductivity within the electrode mixed material layer when the electrode is immersed in an electrolyte solution, and thereby reducing resistance of the electrode mixed material layer, while also suppressing electrode expansion that is associated with charging and discharging.

—Degree of Swelling in Electrolyte Solution—

The degree of swelling in electrolyte solution of the second particulate polymer is required to be at least 300 mass % and no greater than 400 mass %, is preferably at least 330 mass %, and is preferably no greater than 370 mass %. One reason for this is that electrode mixed material layer resistance cannot be sufficiently reduced if the degree of swelling in electrolyte solution of the second particulate polymer is less than 300 mass %, even if the second particulate polymer is used in combination with the previously described first particulate polymer. Moreover, the situation described above results in a decrease in low-temperature output characteristics of a secondary battery produced using the binder composition and also results in insufficient inhibition of deposition of lithium in the form of dendrites (lithium dendrites) when the binder composition is used, for example, to form a negative electrode of a lithium ion secondary battery. Another reason is that electrode expansion that is associated with charging and discharging cannot be sufficiently suppressed if the degree of swelling in electrolyte solution of the second particulate polymer is greater than 400 mass %.

The degree of swelling in electrolyte solution of the second particulate polymer can be adjusted, without any specific limitations, by the same techniques as described for the first particulate polymer.

—Number Average Particle Diameter—

The number average particle diameter of the second particulate polymer is preferably at least 250 nm, and is also preferably no greater than 400 nm. One reason for this is that it is possible to achieve favorable suppression of electrode expansion and reduction of electrode mixed material layer resistance as a result of the number average particle diameter being in the aforementioned range.

The number average particle diameter of the second particulate polymer can be adjusted, without any specific limitations, by the same techniques as described for the first particulate polymer.

The number average particle diameter of the second particulate polymer is preferably larger than the number average particle diameter of the first particulate polymer. A ratio of the number average particle diameter of the second particulate polymer relative to the number average particle diameter of the first particulate polymer (number average particle diameter of second particulate polymer/number average particle diameter of first particulate polymer) is preferably at least 1.8, more preferably at least 2.0, and further preferably at least 2.9, and is preferably no greater than 4.4, more preferably no greater than 4.1, and further preferably no greater than 4.0. One reason for this is that a decrease in electrode strength can be suppressed while also further reducing electrode mixed material layer resistance through the number average particle diameter of the second particulate polymer being larger than the number average particle diameter of the first particulate polymer, and through the ratio of the number average particle diameter of the second particulate polymer relative to the number average particle diameter of the first particulate polymer (hereinafter, also simply referred to as the "particle diameter ratio") being at least 1.8 and no greater than 4.4. Note that if the particle diameter ratio is less than 1.8, it may not be possible to sufficiently reduce electrode mixed material layer resistance. Conversely, if the particle diameter ratio is greater than 4.4, there may be a decrease in electrode strength.

Although it has not yet been clarified why adjustment of the number average particle diameters of the first particulate polymer and the second particulate polymer enables suppression of a decrease in electrode strength while sufficiently reducing electrode mixed material layer resistance, the reason for this is presumed to be as follows. Specifically, when a slurry composition prepared using the binder composition is applied onto a current collector and is dried thereon to form an electrode mixed material layer, it is presumed that in a situation in which the particle diameter ratio is small, the first particulate polymer and the second particulate polymer tend to collect more densely at a surface side of the electrode mixed material layer due to thermal convection, and, as a result of this uneven distribution of the particulate polymers, it is not possible to sufficiently reduce resistance of the electrode mixed material layer. Furthermore, it is presumed that in a situation in which the number average particle diameter of the second particulate polymer and the particle diameter ratio are large, electrode strength is reduced as a result of the contact area between the second particulate polymer and the electrode active material or the current collector decreasing, and also as a result of thermal convection during formation of the electrode mixed material layer causing the small-particle diameter first particulate polymer to become distributed unevenly toward the surface side of the electrode mixed material layer and the large-particle diameter second particulate polymer to become distributed unevenly toward a current collector side of the electrode mixed material layer (i.e., homogeneity of the electrode mixed material layer is reduced).

—Gel Content—

The gel content of the second particulate polymer is preferably at least 80 mass % and no greater than 98 mass %, and more preferably at least 85 mass % and no greater than 95 mass %. One reason for this is that close adherence between a current collector and an electrode mixed material layer of an electrode produced using the binder composition can be increased and peel strength of the electrode can be improved through the gel content of the second particulate polymer being at least 80 mass %. Another reason is that electrode mixed material layer resistance can be favorably reduced through the gel content of the second particulate polymer being no greater than 98 mass %.

The gel content of the second particulate polymer can be adjusted, without any specific limitations, by the same techniques as described for the first particulate polymer.

—Polymer Composition—

A polymer composing the second particulate polymer may be any polymer that has the properties described above and that exists in a particulate state in an aqueous medium used as a dispersion medium. Specifically, the polymer composing the second particulate polymer may for example be, but is not specifically limited to, a polymer that includes a copolymer (B) containing a (meth)acrylic acid ester monomer unit, and is more preferably a polymer composed of the copolymer (B) containing the (meth)acrylic acid ester monomer unit. The following describes the copolymer (B) containing the (meth)acrylic acid ester monomer unit as one example of a polymer that can compose the second particulate polymer.

Examples of (meth)acrylic acid ester monomers that can be used to form the (meth)acrylic acid ester monomer unit in the copolymer (B) include, but are not specifically limited to, the same (meth)acrylic acid ester monomers as described for the copolymer (A). Of these (meth)acrylic acid ester monomers, alkyl acrylates are preferable, and ethyl acrylate, n-butyl acrylate, and 2-ethylhexyl acrylate are more preferable. One type of (meth)acrylic acid ester monomer may be used individually, or two or more types of (meth)acrylic acid ester monomers may be used in combination in a freely selected ratio.

The percentage content of the (meth)acrylic acid ester monomer unit in the copolymer (B) is preferably at least 80 mass % and more preferably at least 85 mass %, and is preferably no greater than 99 mass % and more preferably no greater than 98 mass %.

In addition to the (meth)acrylic acid ester monomer unit described above, the copolymer (B) may optionally contain an ethylenically unsaturated carboxylic acid monomer unit, a vinyl cyanide-based monomer unit, a crosslinkable monomer unit, and other optional monomer units.

Examples of ethylenically unsaturated carboxylic acid monomers that can be used to form an ethylenically unsaturated carboxylic acid monomer unit in the copolymer (B) include, but are not specifically limited to, the same ethylenically unsaturated carboxylic acid monomers as described for the copolymer (A). Of these ethylenically unsaturated carboxylic acid monomers, ethylenically unsaturated monocarboxylic acid monomers are preferable, and acrylic acid and methacrylic acid are more preferable. One type of ethylenically unsaturated carboxylic acid monomer may be used individually, or two or more types of ethylenically unsaturated carboxylic acid monomers may be used in combination in a freely selected ratio.

The percentage content of the ethylenically unsaturated carboxylic acid monomer unit in the copolymer (B) is preferably at least 0.1 mass %, more preferably at least 0.2 mass %, and particularly preferably at least 0.3 mass %, and is preferably no greater than 10 mass %, more preferably no greater than 8 mass %, and particularly preferably no greater than 5 mass %.

Examples of vinyl cyanide-based monomers that can be used to form a vinyl cyanide-based monomer unit in the copolymer (B) include, but are not specifically limited to, the same vinyl cyanide-based monomers as described for the copolymer (A). Of these vinyl cyanide-based monomers, acrylonitrile is preferable. One type of vinyl cyanide-based monomer may be used individually, or two or more types of vinyl cyanide-based monomers may be used in combination in a freely selected ratio.

The percentage content of the vinyl cyanide-based monomer unit in the copolymer (B) is preferably at least 0.1 mass % and more preferably at least 0.2 mass %, and is preferably no greater than 10 mass % and more preferably no greater than 5 mass %.

Examples of crosslinkable monomers that can be used to form a crosslinkable monomer unit in the copolymer (B) typically include monomers that are thermally crosslinkable. More specifically, example of crosslinkable monomers that can be used include a monofunctional monomer having a thermally crosslinkable group and one olefinic double bond per molecule, and a multifunctional monomer having two or more olefinic double bonds per molecule.

Examples of the thermally crosslinkable group include an epoxy group, an N-methylolamide group, an oxetanyl group, an oxazoline group, and combinations thereof. Of these thermally crosslinkable groups, an epoxy group is preferable due to the ease with which crosslinking and crosslinking density can be adjusted.

Examples of crosslinkable monomers having an epoxy group as a thermally crosslinkable group and having an olefinic double bond include unsaturated glycidyl ethers such as vinyl glycidyl ether, allyl glycidyl ether, butenyl glycidyl ether, and o-allyl phenyl glycidyl ether; monoepoxides of dienes and polyenes such as butadiene monoepoxide, chloroprene monoepoxide, 4,5-epoxy-2-pentene, 3,4-epoxy-1-vinylcyclohexene, and 1,2-epoxy-5,9-cyclododecadiene; alkenyl epoxides such as 3,4-epoxy-1-butene, 1,2-epoxy-5-hexene, and 1,2-epoxy-9-decene; and glycidyl esters of unsaturated carboxylic acids such as glycidyl acrylate, glycidyl methacrylate, glycidyl crotonate, glycidyl-4-heptenoate, glycidyl sorbate, glycidyl linoleate, glycidyl-4-methyl-3-pentenoate, glycidyl ester of 3-cyclohexenecarboxylic acid, and glycidyl ester of 4-methyl-3-cyclohexenecarboxylic acid.

Examples of crosslinkable monomers having an N-methylolamide group as a thermally crosslinkable group and having an olefinic double bond include (meth)acrylamides having a methylol group such as N-methylol(meth)acrylamide.

In the present description, "(meth)acrylamide" is used to indicate "acrylamide" and/or "methacrylamide".

Examples of crosslinkable monomers having an oxetanyl group as a thermally crosslinkable group and having an olefinic double bond include 3-((meth)acryloyloxymethyl) oxetane, 3-((meth)acryloyloxymethyl)-2-trifluoromethyloxetane, 3-((meth)acryloyloxymethyl)-2-phenyloxetane, 2-((meth)acryloyloxymethyl)oxetane, and 2-((meth)acryloyloxymethyl)-4-trifluoromethyloxetane.

In the present description, "(meth)acryloyl" is used to indicate "acryloyl" and/or "methacryloyl".

Examples of crosslinkable monomers having an oxazoline group as a thermally crosslinkable group and having an olefinic double bond include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline.

Examples of multifunctional monomers having two or more olefinic double bonds include allyl (meth)acrylate, ethylene di(meth)acrylate, diethylene glycol di(meth)acrylate, triethylene glycol di(meth)acrylate, tetraethylene glycol di(meth)acrylate, trimethylolpropane-tri(meth)acrylate, dipropylene glycol diallyl ether, polyglycol diallyl ether, triethyleneglycol divinyl ether, hydroquinone diallyl ether, tetraallyloxyethane, trimethylolpropane-diallyl ether, allyl and vinyl ethers of multifunctional alcohols other than those listed above, triallylamine, methylene bisacrylamide, and divinylbenzene.

In the present description, "(meth)acrylate" is used to indicate "acrylate" and/or "methacrylate".

Of the examples described above, the crosslinkable monomer is preferably a crosslinkable monomer having an epoxy group as a thermally crosslinkable group and having an olefinic double bond or a multifunctional monomer having two or more olefinic double bonds, and is particularly preferably allyl methacrylate, ethylene dimethacrylate, allyl glycidyl ether, or glycidyl methacrylate.

One type of crosslinkable monomer may be used individually, or two or more types of crosslinkable monomers may be used in combination in a freely selected ratio.

The percentage content of the crosslinkable monomer unit in the copolymer (B) is preferably at least 0.1 mass % and more preferably at least 0.2 mass %, and is preferably no greater than 2 mass % and more preferably no greater than 1.5 mass %.

Examples of optional monomer units include monomer units yielded by polymerizing any of the following optional monomers. One type of optional monomer may be used individually, or two or more types of optional monomers may be used in combination in a freely selected ratio.

Examples of optional monomers that can be used include styrene-based monomers such as styrene, chlorostyrene, vinyltoluene, t-butylstyrene, methyl vinylbenzoate, vinylnaphthalene, chloromethylstyrene, hydroxymethylstyrene, and $\alpha$-methylstyrene; sulfonate group-containing monomers such as vinyl sulfonic acid, styrene sulfonic acid, allyl sulfonic acid, sulfoethyl methacrylate, sulfopropyl methacrylate, and sulfobutyl methacrylate; alkali metal salts of sulfonate group-containing monomers; and fluorine-containing (meth)acrylic acid ester monomers.

The percentage content of such optional monomer units in the copolymer (B) is preferably at least 0 mass % and no greater than 30 mass %, and more preferably at least 0 mass % and no greater than 25 mass %.

The second particulate polymer composed of the copolymer (B) described above can for example be produced by polymerizing a monomer composition containing the above-described monomers in an aqueous solvent in the same way as the first particulate polymer. The percentage content of each of the monomers in the monomer composition is normally the same as the percentage content of the corresponding repeat unit in the target copolymer (B).

[Third Particulate Polymer]

In addition to the first particulate polymer and the second particulate polymer described above, the particulate binding material of the presently disclosed binder composition preferably contains a third particulate polymer that is particulate polymer other than the first particulate polymer and the second particulate polymer.

Specifically, from a viewpoint of further suppressing electrode expansion and increasing peel strength of an electrode for secondary battery-use, while also sufficiently reducing electrode mixed material layer resistance, the particulate binding material of the presently disclosed binder composition preferably contains a third particulate polymer having a degree of swelling in electrolyte solution of at least 130 mass % and no greater than 250 mass %.

—Degree of Swelling in Electrolyte Solution—

Herein, the degree of swelling in electrolyte solution of the third particulate polymer is preferably at least 130 mass % and more preferably at least 140 mass %, and is preferably no greater than 250 mass % and more preferably no greater than 200 mass %. One reason for this is that through the degree of swelling in electrolyte solution of the third particulate polymer being at least 130 mass %, it is possible to inhibit the third particulate polymer from impairing ion conductivity in an electrode mixed material layer so that it is possible to sufficiently reduce resistance of the electrode mixed material layer even when the third particulate polymer is used. Another reason is that through the degree of swelling in electrolyte solution of the third particulate polymer being no greater than 250 mass %, electrode expansion that is associated with charging and discharging can be further suppressed and peel strength of an electrode for secondary battery-use can be increased.

The degree of swelling in electrolyte solution of the third particulate polymer can be adjusted, without any specific limitations, by the same techniques as described for the first particulate polymer and the second particulate polymer.

—Number Average Particle Diameter—

The number average particle diameter of the third particulate polymer is preferably at least 140 nm, and is also preferably no greater than 200 nm. One reason for this is that electrode expansion that is associated with charging and discharging can be even further suppressed and peel strength of an electrode for secondary battery-use can be sufficiently increased as a result of the number average particle diameter being in the aforementioned range.

The number average particle diameter of the third particulate polymer can be adjusted, without any specific limitations, by the same techniques as described for the first particulate polymer and the second particulate polymer.

The number average particle diameter of the third particulate polymer is preferably larger than the number average particle diameter of the first particulate polymer and is preferably smaller than the number average particle diameter of the second particulate polymer. One reason for this is that electrode mixed material layer resistance can be sufficiently reduced as a result of the number average particle diameter of the third particulate polymer being larger than the number average particle diameter of the first particulate polymer. Another reason is that electrode expansion can be further suppressed and peel strength of an electrode for secondary battery-use can be further increased as a result of the number average particle diameter of the third particulate polymer being smaller than the number average particle diameter of the second particulate polymer.

In general, when a slurry composition prepared using a binder composition is applied onto a current collector and is dried on the current collector to form an electrode mixed material layer, thermal convection causes a particulate polymer having a small number average particle diameter to become distributed more readily at a surface side of the electrode mixed material layer and causes a particulate polymer having a large number average particle diameter to become distributed more readily at a current collector side of the electrode mixed material layer. Accordingly, in a situation in which only increasing peel strength of an electrode for secondary battery-use is taken into account, one might consider setting the number average particle diameter of the third particulate polymer, which has a small degree of swelling in electrolyte solution, as the largest number average particle diameter. However, from a viewpoint of enhancing the effect of suppressing electrode expansion while also increasing peel strength of the electrode for secondary battery-use, it is preferable that the third particulate polymer is appropriately dispersed in the electrode mixed material layer. Therefore, the number average particle diameter of the third particulate polymer is preferably smaller than the number average particle diameter of the second particulate polymer. Note that if the number average particle diameter of the third particulate polymer is smaller than the number average particle diameter of the first particulate polymer, the third particulate polymer becomes distributed unevenly toward the surface side of the electrode mixed material layer, which may lead to an increase in resistance at the surface of the electrode mixed material layer and facilitate deposition of lithium dendrites and the like.

—Gel Content—

The gel content of the third particulate polymer is preferably at least 80 mass % and no greater than 98 mass %, and is more preferably at least 85 mass % and no greater than 95 mass %. One reason for this is that close adherence between a current collector and an electrode mixed material layer of an electrode produced using the binder composition can be increased and peel strength of the electrode can be improved as a result of the gel content of the third particulate polymer being at least 80 mass %. Another reason is that electrode mixed material layer resistance can be sufficiently reduced as a result of the gel content of the third particulate polymer being no greater than 98 mass %.

The gel content of the third particulate polymer can be adjusted, without any specific limitations, by the same techniques as described for the first particulate polymer and the second particulate polymer.

—Polymer Composition—

A polymer composing the third particulate polymer may be any polymer that has the properties described above and that exists in a particulate state in an aqueous medium used as a dispersion medium. Specifically, the polymer composing the third particulate polymer may for example be, but is not specifically limited to, a polymer including a copolymer (C) that contains an aliphatic conjugated diene monomer unit and an aromatic vinyl monomer unit, and may more preferably be a polymer composed of the copolymer (C) containing the aliphatic conjugated diene monomer unit and the aromatic vinyl monomer unit. The following describes the copolymer (C) containing the aliphatic conjugated diene monomer unit and the aromatic vinyl monomer unit as one example of a polymer that can compose the third particulate polymer.

Examples of aliphatic conjugated diene monomers that can be used to form the aliphatic conjugated diene monomer unit in the copolymer (C) include, but are not specifically limited to, the same aliphatic conjugated diene monomers as described for the copolymer (A). Of these aliphatic conjugated diene monomers, 1,3-butadiene is preferable. One type of aliphatic conjugated diene monomer may be used individually, or two or more types of aliphatic conjugated diene monomers may be used in combination in a freely selected ratio.

Examples of aromatic vinyl monomers that can be used to form the aromatic vinyl monomer unit in the copolymer (C) include, but are not specifically limited to, the same aromatic vinyl monomers as described for the copolymer (A). Of these aromatic vinyl monomers, styrene is preferable. One type of aromatic vinyl monomer may be used individually, or two or more types of aromatic vinyl monomers may be used in combination in a freely selected ratio.

The percentage content of the aromatic vinyl monomer unit in the copolymer (C) relative to the total amount of the aliphatic conjugated diene monomer unit and the aromatic vinyl monomer unit is preferably at least 42 mass %, more preferably at least 49 mass %, and further preferably at least 55 mass %, and is preferably no greater than 87 mass %, more preferably no greater than 80 mass %, and further preferably no greater than 70 mass %. If the percentage content of the aromatic vinyl monomer unit (aromatic vinyl monomer unit/(aliphatic conjugated diene monomer unit+aromatic vinyl monomer unit)) is less than 42 mass %, flexibility of the third particulate polymer may become excessively high and it may not be possible for the third particulate polymer to adequately implement a function of suppressing electrode expansion. Moreover, if the percentage content of the aromatic vinyl monomer unit is greater than 87 mass %, flexibility of the third particulate polymer may become excessively low.

The copolymer (C) is preferably a styrene-butadiene copolymer that contains a 1,3-butadiene unit as the aliphatic conjugated diene monomer unit and a styrene unit as the aromatic vinyl monomer unit.

The copolymer (C) used as the third particulate polymer may contain other monomer units besides the aliphatic conjugated diene monomer unit and the aromatic vinyl monomer unit described above.

Specifically, in addition to the aliphatic conjugated diene monomer unit and the aromatic vinyl monomer unit, the copolymer (C) preferably contains an ethylenically unsaturated carboxylic acid monomer unit.

Examples of ethylenically unsaturated carboxylic acid monomers that can be used to form the ethylenically unsaturated carboxylic acid monomer unit in the copolymer (C) include, but are not specifically limited to, the same ethylenically unsaturated carboxylic acid monomers as described for the copolymer (A). Of these ethylenically unsaturated carboxylic acid monomers, acrylic acid, methacrylic acid, and itaconic acid are preferable. One type of ethylenically unsaturated carboxylic acid monomer may be used individually, or two or more types of ethylenically unsaturated carboxylic acid monomers may be used in combination in a freely selected ratio.

The percentage content of the ethylenically unsaturated carboxylic acid monomer unit in the copolymer (C) is preferably at least 0.5 mass %, more preferably at least 1 mass %, and particularly preferably at least 2 mass %, and is preferably no greater than 10 mass %, more preferably no greater than 8 mass %, and particularly preferably no greater than 7 mass %.

As long as the disclosed effects are not significantly impaired, the copolymer (C) may contain optional repeat units other than those described above. Examples of monomers corresponding to the aforementioned optional repeat units include a vinyl cyanide-based monomer, a (meth) acrylic acid ester monomer, a hydroxyalkyl group-containing unsaturated monomer, and an unsaturated carboxylic acid amide monomer. One of these monomers may be used individually, or two or more of these monomers may be used in combination in a freely selected ratio.

The third particulate polymer composed of the copolymer (C) described above can for example be produced by polymerizing a monomer composition containing the above-described monomers in an aqueous solvent in the same way as the first particulate polymer. The percentage content of each of the monomers in the monomer composition is normally the same as the percentage content of the corresponding repeat unit in the target copolymer (C).

[Particulate Polymer Content]

In the presently disclosed binder composition, the content of the first particulate polymer, expressed as a solid content-converted value per a total of 100 parts by mass of the first particulate polymer and the second particulate polymer, is preferably at least 70 parts by mass and more preferably at least 75 parts by mass, and is preferably no greater than 95 parts by mass, more preferably no greater than 90 parts by mass, and further preferably no greater than 85 parts by mass.

Moreover, in the presently disclosed binder composition, the content of the second particulate polymer, expressed as a solid content-converted value per a total of 100 parts by mass of the first particulate polymer and the second particulate polymer, is preferably at least 5 parts by mass, more preferably at least 10 parts by mass, and further preferably at least 15 parts by mass, and is preferably no greater than 30 parts by mass and more preferably no greater than 25 parts by mass.

One reason for this is that it may not be possible to sufficiently reduce electrode mixed material layer resistance if the percentage content of the first particulate polymer is excessively small. Another reason is that it may not be possible to sufficiently suppress electrode expansion if the percentage content of the second particulate polymer is excessively small and the percentage content of the first particulate polymer is excessively large. Yet another reason is that the binder composition and a slurry composition containing the binder composition may increase in viscosity and suffer from reduced stability if the percentage content of the second particulate polymer is excessively large. However, the cause of this effect is not clear.

In a situation in which the first particulate polymer, the second particulate polymer, and the third particulate polymer are used as the particulate binding material in the presently disclosed binder composition, preferable amounts of the first particulate polymer, the second particulate polymer, and the third particulate polymer, expressed as solid content-converted values per 100 parts by mass of the particulate binding material, are as follows. Specifically, it is preferable that the first particulate polymer and the second particulate polymer are contained in a total amount of at least 30 parts by mass and no greater than 70 parts by mass, and that the third particulate polymer is contained in an amount of at least 30 parts by mass and no greater than 70 parts by mass, and more preferable that the first particulate polymer and the second particulate polymer are contained in a total amount of at least 40 parts by mass and no greater than 60 parts by mass, and that the third particulate polymer is contained in an amount of at least 40 parts by mass and no greater than 60 parts by mass. One reason for this is that suppression of electrode expansion and improvement of peel strength of an electrode for secondary battery-use can be achieved to high levels as a result of the content of the third particulate polymer being at least 30 parts by mass per 100 parts by mass of the particulate binding material and the total content of the first particulate polymer and the second particulate polymer being no greater than 70 parts by mass per 100 parts by mass of the particulate binding material. Another reason is that electrode mixed material layer resistance can be sufficiently reduced as a result of the total content of the first particulate polymer and the second particulate polymer being at least 30 parts by mass per 100 parts by mass of the particulate binding material and the content of the third particulate polymer being no greater than 70 parts by mass per 100 parts by mass of the particulate binding material.

<Other Components>

In addition to the particulate binding material described above, the presently disclosed binder composition may contain other components such as a water-soluble polymer, a conductive additive, a reinforcing material, a leveling agent, a viscosity modifier, or an additive for electrolyte solution. The other components may be any commonly known materials that do not affect the battery reaction. For example, components described in WO 2012/115096 A1 may be used. One of these components may be used individually, or two or more of these components may be used in combination in a freely selected ratio.

<Production of Binder Composition>

The presently disclosed binder composition can be produced by dispersing the above-described components in an aqueous medium that is used as a dispersion medium. Specifically, the above-described components can be mixed with the aqueous medium using a mixer, such as a ball mill, a sand mill, a bead mill, a pigment disperser, a grinding machine, an ultrasonic disperser, a homogenizer, a planetary mixer, or a FILMIX, to prepare a slurry composition.

In a situation in which each of the particulate polymers is produced by polymerizing a monomer composition in an aqueous solvent, these particulate polymers can be mixed as-produced in the form of aqueous dispersions. In a situation in which the particulate polymers are mixed in the form of aqueous dispersions, water in the aqueous dispersions may be used as the aforementioned aqueous medium.

(Slurry Composition for Secondary Battery Electrode-Use)

The presently disclosed slurry composition for secondary battery electrode-use is an aqueous slurry composition that has an aqueous medium as a dispersion medium and that contains an electrode active material and the binder composition described above. In other words, the presently disclosed slurry composition for secondary battery electrode-use contains at least the electrode active material, the previously described particulate binding material, and a dispersion medium such as water, and may further contain other optional components. Since the presently disclosed slurry composition for secondary battery electrode-use contains the previously described binder composition, an electrode mixed material layer that is formed using the slurry composition has sufficiently low resistance. Moreover, in an electrode including the electrode mixed material layer formed using the slurry composition, electrode expansion that is associated with repeated charging and discharging is suppressed.

The following describes one example in which the slurry composition for secondary battery electrode-use is a slurry composition for lithium ion secondary battery electrode-use. However, the present disclosure is not limited to the following example.

<Electrode Active Material>

The electrode active material is a material that accepts and donates electrons at an electrode (positive/negative electrode) of a lithium ion secondary battery. The electrode active material (positive/negative electrode active material) of a lithium ion secondary battery is normally a material that can occlude and release lithium.

[Positive Electrode Active Material]

Specific examples of the positive electrode active material include transition metal-containing compounds, such as a transition metal oxide, a transition metal sulfide, and a composite metal oxide comprising lithium and a transition metal. Examples of the transition metal include Ti, V, Cr, Mn, Fe, Co, Ni, Cu, and Mo.

Examples of the transition metal oxide include MnO, $MnO_2$, $V_2O_5$, $V_6O_{13}$, $TiO_2$, $Cu_2V_2O_3$, amorphous $V_2O$—$P_2O_5$, amorphous $MoO_3$, amorphous $V_2O_5$, and amorphous $V_6O_{13}$.

Examples of the transition metal sulfide include $TiS_2$, $TiS_3$, amorphous $MoS_2$, and FeS.

Examples of the composite metal oxide comprising lithium and a transition metal include a lithium-containing composite metal oxide with a layered structure, a lithium-containing composite metal oxide with a spinel structure, and a lithium-containing composite metal oxide with an olivine structure.

Examples of the lithium-containing composite metal oxide with a layered structure include lithium-containing cobalt oxide ($LiCoO_2$), lithium-containing nickel oxide ($LiNiO_2$), lithium-containing composite oxide of Co—Ni—Mn ($Li(CoMnNi)O_2$), lithium-containing composite oxide of Ni—Mn—Al, lithium-containing composite oxide of Ni—Co—Al, and a solid solution comprising $LiMaO_2$ and $Li_2MbO_3$. Examples of the lithium-containing composite oxide of Co—Ni—Mn include $Li[Ni_{0.5}Co_{0.2}Mn_{0.3}]O_2$ and $Li[Ni_{1/3}Co_{1/3}Mn_{1/3}]O_2$. Examples of the solid solution comprising $LiMaO_2$ and $Li_2MbO_3$ include $xLiMaO_2.(1-x)Li_2MbO_3$ and the like, where x represents a number satisfying $0<x<1$, Ma represents one or more types of transition metals with an average oxidation state of 3+, and Mb represents one or more types of transition metals with an average oxidation state of 4+. Examples of solid solutions such as described above include $Li[N_{0.17}Li_{0.2}Co_{0.07}Mn_{0.56}]O_2$.

The term "average oxidation state" as used herein refers to an average oxidation state of the "one or more types of transition metals" and is calculated from the molar quantities and the valences of the transition metals. For example, in a situation in which the "one or more types of transition metals" is made up of 50 mol % of $Ni^{2+}$ and 50 mol % of $Mn^{4+}$, the average oxidation state of the "one or more types of transition metals" is $(0.5)\times(2+)+(0.5)\times(4+)=3+$.

Examples of the lithium-containing composite metal oxide with a spinel structure include lithium manganate ($LiMn_2O_4$) and compounds obtained by substituting part of Mn contained in lithium manganate ($LiMn_2O_4$) with another transition metal. One specific example thereof is $Li_s[Mn_{2-t}Mc_t]O_4$, such as $LiNi_{0.5}Mn_{1.5}O_4$, where Mc represents one or more types of transition metals having an average oxidation state of 4+, specific examples of which include Ni, Co, Fe, Cu, and Cr; t represents a number satisfying $0<t<1$; and s represents a number satisfying $0\leq s\leq 1$. Another example of the positive electrode active material is lithium-rich spinel compounds represented by $Li_{1+x}Mn_{2-x}O_4$ ($0<x<2$).

Examples of the lithium-containing composite metal oxide with an olivine structure include olivine-type lithium phosphate compounds represented by the formula $Li_yMdPO_4$, such as olivine-type lithium iron phosphate ($LiFePO_4$) and olivine-type manganese lithium phosphate ($LiMnPO_4$), where Md represents one or more types of transition metals having an average oxidation state of 3+, examples of which include Mn, Fe, and Co, and y represents a number satisfying $0\leq y\leq 2$. Md of the olivine-type lithium phosphate compounds represented by the formula $Li_yMdPO_4$ may be partly substituted with another metal. Examples of the metal possibly substituting the part of Md include Cu, Mg, Zn, V, Ca, Sr, Ba, Ti, Al, Si, B, and Mo.

[Negative Electrode Active Material]

Examples of the negative electrode active material include a carbon-based negative electrode active material, a metal-based negative electrode active material, and a negative electrode active material formed by combining these materials.

The carbon-based negative electrode active material can be defined as an active material that contains carbon as its main framework and into which lithium can be inserted (also referred to as "doping"). Examples of the carbon-based negative electrode active material include carbonaceous materials and graphitic materials.

A carbonaceous material is a material with a low degree of graphitization (i.e., low crystallinity) that can be obtained by carbonizing a carbon precursor by heat treatment at 2000° C. or lower. The lower limit of the heat treatment temperature in the carbonization is not specifically limited and may for example be 500° C. or higher.

Examples of the carbonaceous material include graphitizing carbon whose carbon structure can easily be changed according to the heat treatment temperature and non-graphitizing carbon typified by glassy carbon, which has a structure similar to an amorphous structure.

The graphitizing carbon may be a carbon material made using tar pitch obtained from petroleum or coal as a raw material. Specific examples of graphitizing carbon include coke, mesocarbon microbeads (MCMB), mesophase pitch-based carbon fiber, and pyrolytic vapor-grown carbon fiber.

Examples of the non-graphitizing carbon include sintered phenolic resin, polyacrylonitrile-based carbon fiber, quasi-isotropic carbon, sintered furfuryl alcohol resin (PFA), and hard carbon.

The graphitic material is a material having high crystallinity of a similar level to graphite. The graphitic material can be obtained by heat-treating graphitizing carbon at 2000° C. or higher. The upper limit of the heat treatment temperature is not specifically limited and may for example be 5000° C. or lower.

Examples of the graphitic material include natural graphite and artificial graphite.

Examples of the artificial graphite include an artificial graphite obtained by heat-treating carbon containing graphitizing carbon mainly at 2800° C. or higher, graphitized MCMB obtained by heat-treating MCMB at 2000° C. or higher, and graphitized mesophase pitch-based carbon fiber obtained by heat-treating mesophase pitch-based carbon fiber at 2000° C. or higher.

The metal-based negative electrode active material is an active material that contains metal, the structure of which usually contains an element that allows insertion of lithium, and that exhibits a theoretical electric capacitance of 500 mAh/g or higher per unit mass when lithium is inserted. Examples of the metal-based active material include lithium metal; a simple substance of metal that can form a lithium alloy (for example, Ag, Al, Ba, Bi, Cu, Ga, Ge, In, Ni, P, Pb, Sb, Si, Sn, Sr, Zn, or Ti); alloys of the simple substance of metal; and oxides, sulfides, nitrides, silicides, carbides, and phosphides of lithium metal, the simple substance of metal, and the alloys of the simple substance of metal. Of these metal-based negative electrode active materials, active materials containing silicon (silicon-based negative electrode active materials) are preferred. One reason for this is that the capacity of a lithium ion secondary battery can be increased though use of a silicon-based negative electrode active material.

Examples of the silicon-based negative electrode active material include silicon (Si), a silicon-containing alloy, SiO, $SiO_x$, and a composite material of conductive carbon and a Si-containing material obtained by coating or combining the Si-containing material with the conductive carbon. One type of silicon-based negative electrode active material may be used individually, or two or more types of silicon-based negative electrode active materials may be used in combination.

The silicon-containing alloy may for example be an alloy composition that contains silicon, aluminum, and transition metals such as iron, and further contains rare-earth elements such as tin and yttrium.

$SiO_x$ is a compound that contains Si and at least one of SiOand $SiO_2$, where x is usually at least 0.01 and less than 2. $SiO_x$ can for example be formed by utilizing a disproportionation reaction of silicon monoxide (SiO). Specifically, $SiO_x$ can be prepared by heat-treating SiO, optionally in the presence of a polymer such as polyvinyl alcohol, to produce silicon and silicon dioxide. After SiO has been pulverized and mixed with the optional polymer, the heat treatment can be performed at a temperature of 900° C. or higher, and preferably 1000° C. or higher, in an atmosphere containing organic gas and/or vapor.

The composite of a Si-containing material and conductive carbon may be, for example, a compound obtained, for example, by heat-treating a pulverized mixture of SiO, a polymer such as polyvinyl alcohol, and optionally a carbon material in an atmosphere containing organic gas and/or vapor. Furthermore, a commonly known method can be used to obtain the composite of a Si-containing material and conductive carbon, such as a method of coating the surfaces of particles of SiO with organic gas or the like by chemical vapor deposition, or a method of forming composite particles (granulation) by a mechanochemical process using SiO particles and graphite or artificial graphite.

<Binder Composition>

The binder composition contained in the slurry composition for lithium ion secondary battery electrode-use can be the presently disclosed binder composition for secondary battery electrode-use that contains the previously described particulate binding material and water.

The blending amount of the binder composition is not specifically limited. However, the amount of the particulate binding material, expressed as a solid content-converted value, may for example be at least 0.5 parts by mass and no greater than 3.0 parts by mass per 100 parts by mass of the electrode active material.

<Other Components>

Examples of other components that may be contained in the slurry composition include, but are not specifically limited to, the same other components that may be contained in the presently disclosed binder composition. One of these other components may be used individually, or two or more of these other components may be used in combination in a freely selected ratio.

<Production of Slurry Composition>

The slurry composition described above can be produced by dispersing the above-described components in an aqueous medium that is used as a dispersion medium. Specifically, the slurry composition can be produced by mixing the above-described components with the aqueous medium using a mixer such as a ball mill, a sand mill, a bead mill, a pigment disperser, a grinding machine, an ultrasonic disperser, a homogenizer, a planetary mixer, or a FILMIX. Mixing of the above-described components with the aqueous medium may normally be performed for a period of from 10 minutes to several hours in a temperature range of from room temperature to 80° C.

Although water is normally used as the aqueous medium, alternatively, an aqueous solution of a freely selected compound or a mixed solution of a small amount of an organic medium and water may be used. Note that water used as the aqueous medium may include water that was contained in the binder composition.

(Electrode for Secondary Battery-Use)

The above-described slurry composition for secondary battery electrode-use (slurry composition for negative/positive electrode-use) that is produced using the presently disclosed binder composition for secondary battery electrode-use can be used in order to produce an electrode (negative/positive electrode) for secondary battery-use.

Herein, the electrode for secondary battery-use includes a current collector and an electrode mixed material layer that is formed on the current collector. The electrode mixed material layer contains at least an electrode active material and the previously described particulate binding material. It should be noted that components contained in the electrode mixed material layer are components that are contained in the previously described slurry composition for secondary battery electrode-use. Furthermore, the preferred ratio of these components in the electrode mixed material layer is the same as the preferred ratio of these components in the slurry composition.

As a result of the electrode for secondary battery-use being produced using the presently disclosed binder composition for secondary battery electrode-use, a secondary battery can be provided with good low-temperature output characteristics and electrode expansion that is associated with repeated charging and discharging can be suppressed. Moreover, in a situation in which the electrode for secondary battery-use is used, for example, as a negative electrode of a lithium ion secondary battery, deposition of lithium dendrites can be inhibited.

(Method for Producing Electrode for Secondary Battery-Use)

The presently disclosed electrode for secondary battery-use can for example be produced through a step of applying the previously described slurry composition for secondary battery electrode-use onto the current collector (application step) and a step of drying the slurry composition for secondary battery electrode-use that has been applied onto the current collector to form an electrode mixed material layer on the current collector (drying step).

[Application Step]

The previously described slurry composition for secondary battery electrode-use can be applied onto the current collector by any commonly known method without any specific limitations. Specific examples of application methods that can be used include doctor blading, dip coating, reverse roll coating, direct roll coating, gravure coating, extrusion coating, and brush coating. The slurry composition may be applied onto one side or both sides of the current collector. The thickness of the slurry coating on the current collector after application but before drying may be set as appropriate in accordance with the thickness of the electrode mixed material layer to be obtained after drying.

The current collector onto which the slurry composition is applied is a material having electrical conductivity and electrochemical durability. Specifically, the current collector may for example be made of iron, copper, aluminum, nickel, stainless steel, titanium, tantalum, gold, or platinum. Of these materials, copper foil is particularly preferable as a current collector used for a negative electrode. On the other hand, aluminum foil is particularly preferable as a current collector used for a positive electrode. One of the aforementioned materials may be used individually, or two or more of the aforementioned materials may be used in combination in a freely selected ratio.

[Drying Step]

The slurry composition that has been applied onto the current collector may be dried by any commonly known method without any specific limitations. Examples of drying methods that can be used include drying by warm, hot, or low-humidity air; drying in a vacuum; and drying by irradiation with infrared light, electron beams, or the like. Through drying of the slurry composition for electrode-use on the current collector as described above, an electrode mixed material layer is formed on the current collector, thereby providing an electrode for lithium ion secondary battery-use that includes the current collector and the electrode mixed material layer.

After the drying step, the electrode mixed material layer may be further subjected to a pressing process, such as mold pressing or roll pressing. The pressing process can improve close adherence between the electrode mixed material layer and the current collector.

Furthermore, when the electrode mixed material layer contains a curable polymer, the polymer is preferably cured after the electrode mixed material layer has been formed.

Herein, it is preferable that the slurry composition is dried quickly in the drying step from a viewpoint of improving producibility of the electrode for secondary battery-use.

Accordingly, it is preferable that in the production method for the presently disclosed electrode for secondary battery-use, the slurry composition is dried at a high drying temperature of 70° C. or higher in the drying step.

It should be noted that when a slurry composition containing a conventional binder composition is applied and then dried at a high temperature of 70° C. or higher, thermal convection normally causes a particulate binding material to become distributed unevenly toward a surface side of the resultant electrode mixed material layer, which leads to an increase in resistance of the electrode mixed material layer, and makes it difficult to sufficiently suppress electrode expansion. In contrast, since the presently disclosed binder composition and slurry composition described above are used in the production method for the presently disclosed electrode for secondary battery-use, it is possible to produce an electrode having a low-resistance electrode mixed material layer and a low tendency to expand in association with charging and discharging, even in a situation in which the drying temperature is set as a high temperature in order to improve producibility of the electrode for secondary battery-use.

(Secondary Battery)

The presently disclosed secondary battery includes a positive electrode, a negative electrode, an electrolyte solution, and a separator. In the presently disclosed secondary battery, either or both of the positive electrode and the negative electrode are the presently disclosed electrode for secondary battery-use. As a result of the presently disclosed secondary battery including the presently disclosed electrode for secondary battery-use, the presently disclosed secondary battery has excellent low-temperature output characteristics and has a low tendency to experience electrode expansion or deposition of lithium dendrites and the like on an electrode.

The following describes one example in which the secondary battery is a lithium ion secondary battery. However, the present disclosure is not limited to the following example.

<Electrodes>

As explained above, the presently disclosed electrode for secondary battery-use is used as either or both of the positive electrode and the negative electrode. In other words, the positive electrode of the lithium ion secondary battery may be the presently disclosed electrode and the negative electrode of the lithium ion secondary battery may be a known negative electrode other than the presently disclosed electrode. Alternatively, the negative electrode of the lithium ion secondary battery may be the presently disclosed electrode and the positive electrode of the lithium ion secondary battery may be a known positive electrode other than the presently disclosed electrode. Further alternatively, the positive electrode and the negative electrode of the lithium ion secondary battery may both be the presently disclosed electrode.

<Electrolyte Solution>

The electrolyte solution may be formed by dissolving an electrolyte in a solvent.

The solvent may be an organic solvent that can dissolve an electrolyte. Specifically, the solvent may be an alkyl carbonate solvent to which a viscosity modification solvent is added. Examples of the alkyl carbonate solvent include ethylene carbonate, propylene carbonate, and γ-butyrolactone. Examples of the viscosity modification solvent include 2,5-dimethyltetrahydrofuran, tetrahydrofuran, diethyl carbonate, ethyl methyl carbonate, dimethyl carbonate, methyl acetate, dimethoxyethane, dioxolane, methyl propionate, and methyl formate.

The electrolyte may be a lithium salt. Examples of the lithium salt include lithium salts described in JP 2012-204303 A. Of these lithium salts, $LiPF_6$, $LiClO_4$, and $CF_3SO_3Li$ are preferred as electrolytes because they readily dissolve in organic solvents and exhibit a high degree of dissociation.

<Separator>

Examples of the separator include separators described in JP 2012-204303 A. Of these separators, a fine porous membrane made of polyolefinic resin (polyethylene, polypropylene, polybutene, or polyvinyl chloride) is preferred since such a membrane can reduce the total thickness of the separator, which increases the ratio of the electrode active material in the lithium ion secondary battery, and consequently increases the capacity per unit volume.

<Method for Producing Lithium Ion Secondary Battery>

The lithium ion secondary battery may be produced, for example, by stacking the positive electrode and the negative electrode with the separator in-between, rolling or folding the resultant stack as necessary in accordance with the battery shape to place the stack in a battery container, filling the battery container with the electrolyte solution, and sealing the battery container. In order to prevent pressure increase inside the lithium ion secondary battery and occurrence of overcharging or overdischarging, an overcurrent preventing device such as a PTC device or a fuse; an expanded metal; or a lead plate may be provided as necessary. The shape of the lithium ion secondary battery may for example be a coin type, button type, sheet type, cylinder type, prismatic type, or flat type.

EXAMPLES

The following provides a more specific description of the present disclosure based on examples. However, the present disclosure in not limited to the following examples. In the following, "%" and "parts" used to express quantities are by mass, unless otherwise specified.

In the examples and comparative examples, evaluations were performed by the following methods in order to evaluate the degree of swelling in electrolyte solution, the number average particle diameter, and the gel content of a particulate polymer, the peel strength of an electrode, the amount of lithium deposition on an electrode, post-cycling expansion of an electrode, and low-temperature output characteristics of a secondary battery.

<Degree of Swelling in Electrolyte Solution>

An aqueous dispersion containing a particulate polymer was prepared and a film with a thickness of 3±0.3 mm was formed by drying the aqueous dispersion for three days in an environment of 50% humidity and a temperature of from 23° C. to 25° C. The resultant film was cut to a diameter of 12 mm and was precisely weighed.

The mass of the film piece obtained by this cutting was taken to be W0. The film piece was immersed in 50 g of an electrolyte solution (composition: $LiPF_6$ solution of 1.0 M in concentration (mixed solvent of 3/7 (volume ratio) ethylene carbonate/ethyl methyl carbonate used as solvent; 2 mass % (solvent ratio) of vinylene carbonate added as additive)) for 72 hours at an ambient temperature of 60° C., and was allowed to swell. Thereafter, the film piece (swollen film piece) was pulled out of the electrolyte solution, was wiped gently, and the mass W1 thereof was measured.

The degree of swelling (mass %) was calculated according to the following formula.

$$\text{Degree of swelling (mass \%)}=(W1/W0)\times 100$$

<Number Average Particle Diameter>

The number average particle diameter of a particulate polymer was measured using a laser diffraction/scattering particle size analyzer (LS230 produced by Beckman Coulter, Inc.).

Specifically, the laser diffraction/scattering particle size analyzer was used to measure a particle diameter-cumulative number distribution for the particulate polymer with respect to an aqueous dispersion containing the particulate polymer, and the number average particle diameter of the particulate polymer was taken to be a particle diameter at which a value of the cumulative distribution reached 50%.

<Gel Content>

An aqueous dispersion containing a particulate polymer was prepared and a film with a thickness of 3±0.3 mm was formed by drying the aqueous dispersion in an environment of 50% humidity and a temperature of from 23° C. to 25° C. The resultant film was cut to a 1 mm square piece and the mass of the piece, which was approximately 1 g, was precisely weighed.

The mass of the film piece obtained by this cutting was taken to be w0. The film piece was immersed in 100 g of tetrahydrofuran (THF) for 24 hours at 25° C. Thereafter, the film piece was pulled out of the THF, was vacuum dried for 3 hours at 105° C., and the mass w1 of insoluble content was measured.

The gel content (mass %) was calculated according to the following formula.

$$\text{Gel content (mass \%)}=(w1/w0)\times 100$$

<Peel Strength>

A test piece having a rectangular shape of 1.0 cm in width by 10 cm in length was cut out from a produced negative electrode for lithium ion secondary battery-use and was fixed such that the surface at a negative electrode mixed material layer side of the test piece was on top. Adhesive cellophane tape was then attached to the surface at the negative electrode mixed material layer side of the test piece. Tape prescribed by JIS Z1522 was used as the cellophane tape. The cellophane tape was then peeled off from one end of the test piece at a rate of 50 mm/minute and an angle of 180° (i.e., in a direction toward the other end of the test piece) while measuring the stress during peeling. This measurement was performed 10 times to obtain an average value of the stress. The average value was taken to be the peel strength (N/m) and was evaluated based on the following criteria. A greater peel strength indicates better binding of the negative electrode mixed material layer to the current collector.

A: Peel strength of at least 8 N/m

B: Peel strength of at least 5 N/m and less than 8 N/m

C: Peel strength of at least 3 N/m and less than 5 N/m

D: Peel strength of less than 3 N/m

<Amount of Lithium Deposition>

A produced lithium ion secondary battery was charged to a charging depth (SOC: State Of Charge) of 100% by a 1 C constant current at an ambient temperature of 20° C. Next, the battery was disassembled in order to take out the negative electrode. The area of lithium that had been deposited on the surface of the negative electrode mixed material layer was obtained, and a percentage area of lithium deposition (=(area of deposited lithium/area of negative electrode mixed material layer surface)×100%) was calculated. The percentage area of lithium deposition was evaluated based on the following criteria.

A: Percentage area of lithium deposition of less than 10%

B: Percentage area of lithium deposition of at least 10% and less than 30%

C: Percentage area of lithium deposition of at least 30%

<Post-Cycling Expansion>

A produced lithium ion secondary battery was left for 5 hours at an ambient temperature of 25° C. and was then subjected to 100 cycles of an operation, performed at an ambient temperature of 45° C., in which constant current-constant voltage charging (CC-CV charging) of the lithium ion secondary battery was carried out at 1 C to 4.2 V (cut condition 0.02 C) and constant current discharging (CC discharging) of the lithium ion secondary battery was carried out at 1 C to 3 V.

After these 100 cycles, charging was carried out at 1 C and an ambient temperature of 25° C., and the battery was disassembled in a charged state in order to take out the negative electrode. The thickness (d2) of a negative electrode mixed material layer of the negative electrode was measured. The rate of change with respect to the thickness (d0) of the negative-electrode mixed material layer prior to assembly of the lithium ion secondary battery was calculated (post-cycling expansion characteristic=$\{(d2-d0)/d0\}\times 100$ (%)) and was evaluated based on the following criteria. A smaller value for the post-cycling expansion characteristic indicates a smaller degree of post-cycling expansion of the negative electrode.

A: Post-cycling expansion characteristic of less than 25%

B: Post-cycling expansion characteristic of at least 25% and less than 30%

C: Post-cycling expansion characteristic of at least 30% and less than 35%

D: Post-cycling expansion characteristic of at least 35%

<Low-Temperature Output Characteristics>

A produced lithium ion secondary battery was left for 24 hours at an ambient temperature of 25° C. Thereafter, a charging operation of the lithium ion secondary battery was performed for 5 hours with a 0.1 C constant current at an ambient temperature of 25° C., and a post-charging voltage V0 was measured. Subsequently, a discharging operation was performed with a discharge rate of 0.5 C at an ambient temperature of −30° C. and a voltage V1 15 seconds after the start of discharging was measured. Voltage change ΔV, expressed by $\Delta V = V0 - V1$, was calculated, and the calculated voltage change ΔV was evaluated based on the following criteria. A smaller value for the voltage change ΔV indicates better low temperature output characteristics.

A: Voltage change ΔV of less than 1.0 V

B: Voltage change ΔV of at least 1.0 V and less than 1.2 V

C: Voltage change ΔV of at least 1.2 V and less than 1.5 V

D: Voltage change ΔV of at least 1.5 V

Example 1

<Production of Particulate Binding Material>

[Production of First Particulate Polymer A]

A 5 MPa pressure vessel equipped with a stirrer was charged with 18 parts of acrylonitrile as a vinyl cyanide-based monomer, 32 parts of 1,3-butadiene as an aliphatic conjugated diene monomer, 0.3 parts of t-dodecyl mercaptan as a molecular weight modifier, 5 parts of sodium dodecylbenzenesulfonate as an emulsifier, 150 parts of deionized water, and 1 part of potassium persulfate as a polymerization initiator. The contents of the pressure vessel were sufficiently stirred and were then heated to 55° C. to initiate polymerization of a first polymer component. Once the amount of monomer consumption had reached 80.0%, an aqueous dispersion was added that had been prepared by pre-mixing of 14 parts of styrene as an aromatic vinyl monomer, 13 parts of 1,3-butadiene as an aliphatic conjugated diene monomer, 8 parts of acrylonitrile as a vinyl cyanide-based monomer, 12 parts of methyl methacrylate as a (meth)acrylic acid ester monomer, 1 part of acrylic acid and 2 parts of itaconic acid as ethylenically unsaturated carboxylic acid monomers, 0.4 parts of t-dodecyl mercaptan as a molecular weight modifier, 5 parts of sodium dodecylbenzenesulfonate as an emulsifier, 150 parts of deionized water, and 1 part of potassium persulfate as a polymerization initiator. Polymerization of a second polymer component was carried out until the amount of consumption of all charged monomers had reached 95.0%, at which point, cooling was performed in order to terminate the reaction. The aqueous dispersion containing the resultant polymer (composite polymer) was adjusted to pH 8 through addition of 5% sodium hydroxide aqueous solution. Thereafter, unreacted monomers were removed by distillation under heating and reduced pressure. Cooling was then performed to 30° C. or lower to yield an aqueous dispersion containing a first particulate polymer A composed of the composite polymer (i.e., an aqueous dispersion of the first particulate polymer A). The degree of swelling in electrolyte solution, the number average particle diameter, and the gel content of the first particulate polymer A were measured by the previously described methods. The results are shown in Table 1.

[Production of Second Particulate Polymer A]

A 5 MPa pressure vessel equipped with a stirrer was charged with 95 parts of butyl acrylate as a (meth)acrylic acid ester monomer, 2 parts of acrylonitrile as a vinyl cyanide-based monomer, 1 part of allyl methacrylate as a crosslinkable monomer, 2 parts of methacrylic acid as an ethylenically unsaturated carboxylic acid monomer, 0.3 parts of t-dodecyl mercaptan as a molecular weight modifier, 0.4 parts of sodium dodecylbenzenesulfonate as an emulsifier, 150 parts of deionized water, and 0.5 parts of potassium persulfate as a polymerization initiator. The contents of the pressure vessel were sufficiently stirred and were then heated to 50° C. to initiate polymerization. Cooling was performed in order to terminate the reaction once the polymerization conversion rate had reached 96%. The aqueous dispersion containing the resultant copolymer was adjusted to pH 8 through addition of 5% sodium hydroxide aqueous solution. Thereafter, unreacted monomers were removed by distillation under heating and reduced pressure. Cooling was then performed to 30° C. or lower to yield an aqueous dispersion containing a second particulate polymer A composed of the copolymer (i.e., an aqueous dispersion of the second particulate polymer A). The degree of swelling in electrolyte solution, the number average particle diameter, and the gel content of the second particulate polymer A were measured by the previously described methods. The results are shown in Table 1. [Production of third particulate polymer A]

A 5 MPa pressure vessel equipped with a stirrer was charged with 33 parts of 1,3-butadiene as an aliphatic conjugated diene monomer, 3.5 parts of itaconic acid as an ethylenically unsaturated carboxylic acid monomer, 62.5 parts of styrene as an aromatic vinyl monomer, 1 part of 2-hydroxyethyl acrylate as a hydroxyalkyl group-containing unsaturated monomer, 0.3 parts of t-dodecyl mercaptan as a molecular weight modifier, 0.4 parts of sodium dodecylbenzenesulfonate as an emulsifier, 150 parts of deionized water, and 0.5 parts of potassium persulfate as a polymerization initiator. The contents of the pressure vessel were sufficiently stirred and were then heated to 50° C. to initiate polymerization. Cooling was performed in order to terminate the reaction once the polymerization conversion rate had reached 96%. The aqueous dispersion containing the resultant copolymer was adjusted to pH 8 through addition of 5% sodium hydroxide aqueous solution. Thereafter, unreacted monomers were removed by distillation under heating and reduced pressure. Cooling was then performed to 30° C. or lower to yield an aqueous dispersion containing a third particulate polymer A composed of the copolymer (i.e., an aqueous dispersion of the third particulate polymer A). The degree of swelling in electrolyte solution, the number average particle diameter, and the gel content of the third particulate polymer A were measured by the previously described methods. The results are shown in Table 1.

<Production of Slurry Composition for Lithium Ion Secondary Battery Negative Electrode-Use>

A planetary mixer equipped with a disper blade was charged with 100 parts of amorphous carbon-coated natural graphite (specific surface area: 3.2 $m^2/g$, volume average particle diameter: 16 μm) as a negative electrode active material, 2 parts of a conductive additive (DENKA Black® (DENKA Black is a registered trademark in Japan, other countries, or both)), and 1 part by solid content equivalents of a 1% carboxymethyl cellulose aqueous solution. The resultant mixture was adjusted to a solid content concentration of 60% using deionized water and was then mixed for 60 minutes at 25° C.

Next, the mixture was adjusted to a solid content concentration of 52% using deionized water and was then further mixed for 15 minutes at 25° C. to yield a liquid mixture.

Next, a binder composition obtained by mixing the aqueous dispersion of the first particulate polymer A, the aqueous dispersion of the second particulate polymer A, and the aqueous dispersion of the third particulate polymer A in the proportions show in Table 1 was added to the liquid mixture. Deionized water was also added in order to adjust the final solid content concentration to 50% and mixing was performed for a further 10 minutes. The resultant liquid mixture was subjected to a defoaming process under reduced pressure to yield a slurry composition for negative electrode-use.

<Production of Negative Electrode for Lithium Ion Secondary Battery-Use>

The produced slurry composition for negative electrode-use was applied onto copper foil (current collector) of 15 μm in thickness with an application amount of from 9 $mg/cm^2$ to 10 $mg/cm^2$ using a comma coater, and was dried thereon. The drying was performed by conveying the copper foil within a 70° C. oven for 2 minutes at a speed of 0.5 m/minute.

Thereafter, heat treatment was performed for 2 minutes at 120° C. to obtain a negative electrode web.

The obtained negative electrode web was pressed using a roll press such as to have a density of from 1.50 $g/cm^3$ to 1.60 $g/cm^3$ and the resultant product was used as a negative electrode.

The peel strength of the produced negative electrode was evaluated. The results are shown in Table 1.

<Production of Positive Electrode for Lithium Ion Secondary Battery-Use>

A planetary mixer was charged with 100 parts of $LiCoO_2$ as a positive electrode active material, 2 parts of acetylene black (HS-100 produced by Denki Kagaku Kogyo Kabushiki Kaisha) as a conductive additive, and 2 parts of PVDF (polyvinylidene fluoride, KF-1100 produced by Kureha Corporation) as a binding material. N-methylpyrrolidone was also added such that the total solid content concentration was 67% and mixing was performed to yield a slurry composition for positive electrode-use.

The resultant slurry composition for positive electrode-use was applied onto aluminum foil (current collector) of 20 μm in thickness using a comma coater, and was dried thereon. The drying was performed by conveying the aluminum foil within a 60° C. oven for 2 minutes at a speed of 0.5 m/minute.

Thereafter, heat treatment was performed for 2 minutes at 120° C. to obtain a positive electrode web.

The obtained positive electrode web was pressed using a roll press such as to have a density of from 3.10 $g/cm^3$ to 3.20 $g/cm^3$ and the resultant product was used as a positive electrode.

<Production of Lithium Ion Secondary Battery>

A single-layer separator made from polypropylene (width 65 mm, length 500 mm, thickness 25 μm; produced by a dry method; porosity 55%) was prepared and was cut out as a 5 cm×5 cm square. An aluminum packing case was prepared as a battery case.

The produced positive electrode was cut out as a 4 cm×4 cm square and was positioned such that a surface at the current collector side of the positive electrode was in contact with the aluminum packing case. Next, the square separator was positioned on a surface at the positive electrode mixed material layer side of the positive electrode. Furthermore, the produced negative electrode was cut out as a 4.2 cm×4.2 cm square and was positioned on the separator such that a surface at the negative electrode mixed material layer side of the negative electrode faced the separator. Thereafter, the aluminum packing case was filled with an $LiPF_6$ solution having a concentration of 1.0 M (mixed solvent of 3/7 (volume ratio) ethylene carbonate/ethyl methyl carbonate used as solvent; 2 mass % (solvent ratio) of vinylene carbonate added as additive) as an electrolyte solution. The aluminum packing case was then closed with heat sealing at 150° C. to tightly seal up the opening of the aluminum packing case, and a lithium ion secondary battery was accordingly produced.

The amount of lithium deposition, post-cycling expansion, and low-temperature output characteristics were evaluated with respect to the produced lithium ion secondary battery. The results are shown in Table 1.

Example 2

A slurry composition for lithium ion secondary battery negative electrode-use, a negative electrode for lithium ion secondary battery-use, a positive electrode for lithium ion secondary battery-use, and a lithium ion secondary battery were produced in the same way as in Example 1 with the exception that the third particulate polymer A was not used, and the first particulate polymer A and the second particulate polymer A were used in the proportions shown in Table 1. Evaluations were conducted in the same manner as in Example 1. The results are shown in Table 1.

Example 3

A slurry composition for lithium ion secondary battery negative electrode-use, a negative electrode for lithium ion secondary battery-use, a positive electrode for lithium ion secondary battery-use, and a lithium ion secondary battery were produced in the same way as in Example 1 with the exception that the first particulate polymer A was replaced with a first particulate polymer B. The first particulate polymer B was produced in the same way as the first particulate polymer A with the exception that, in polymerization of the first polymer component, the blending amount of t-dodecyl mercaptan was changed to 0.2 parts, and, in polymerization of the second polymer component, the blending amount of styrene was changed to 19 parts, the blending amount of acrylonitrile was changed to 3 parts, and the blending amount of t-dodecyl mercaptan was changed to 0.35 parts. Evaluations were conducted in the same manner as in Example 1. The results are shown in Table 1.

Example 4

A slurry composition for lithium ion secondary battery negative electrode-use, a negative electrode for lithium ion secondary battery-use, a positive electrode for lithium ion secondary battery-use, and a lithium ion secondary battery were produced in the same way as in Example 1 with the exception that the first particulate polymer A was replaced with a first particulate polymer C. The first particulate polymer C was produced in the same way as the first particulate polymer A with the exception that, in polymerization of the first polymer component, the blending amount of 1,3-butadiene was changed to 28 parts, the blending amount of acrylonitrile was changed to 22 parts, and the blending amount of t-dodecyl mercaptan was change to 0.2 parts, and, in polymerization of the second polymer component, the blending amount of t-dodecyl mercaptan was changed to 0.3 parts. Evaluations were conducted in the same manner as in Example 1. The results are shown in Table 1.

Example 5

A slurry composition for lithium ion secondary battery negative electrode-use, a negative electrode for lithium ion secondary battery-use, a positive electrode for lithium ion secondary battery-use, and a lithium ion secondary battery were produced in the same way as in Example 1 with the exception that the second particulate polymer A was replaced with a second particulate polymer B. The second particulate polymer B was produced in the same way as the second particulate polymer A with the exception that the blending amount of t-dodecyl mercaptan was changed to 0.25 parts. Evaluations were conducted in the same manner as in Example 1. The results are shown in Table 1.

Example 6

A slurry composition for lithium ion secondary battery negative electrode-use, a negative electrode for lithium ion secondary battery-use, a positive electrode for lithium ion secondary battery-use, and a lithium ion secondary battery were produced in the same way as in Example 1 with the exception that the second particulate polymer A was replaced with a second particulate polymer C. The second particulate polymer C was produced in the same way as the second particulate polymer A with the exception that the blending amount of butyl acrylate was changed to 94.5 parts, the blending amount of acrylonitrile was changed to 2.5 parts, the blending amount of t-dodecyl mercaptan was changed to 0.4 parts, and the blending amount of sodium dodecylbenzenesulfonate was changed to 0.3 parts. Evaluations were conducted in the same manner as in Example 1. The results are shown in Table 1.

Examples 7 and 8

A slurry composition for lithium ion secondary battery negative electrode-use, a negative electrode for lithium ion secondary battery-use, a positive electrode for lithium ion secondary battery-use, and a lithium ion secondary battery were produced in the same way as in Example 1 with the exception that the blending amounts of the first particulate polymer A and the second particulate polymer A were changed as shown in Table 1. Evaluations were conducted in the same manner as in Example 1. The results are shown in Table 1.

Example 9

A slurry composition for lithium ion secondary battery negative electrode-use, a negative electrode for lithium ion secondary battery-use, a positive electrode for lithium ion secondary battery-use, and a lithium ion secondary battery were produced in the same way as in Example 1 with the exception that the first particulate polymer A was replaced with a first particulate polymer D. The first particulate polymer D was produced in the same way as the first particulate polymer A with the exception that, in polymerization of the first polymer component, t-dodecyl mercaptan was not used and the blending amount of sodium dodecylbenzenesulfonate was changed to 8 parts, and, in polymerization of the second polymer component, the blending amount of t-dodecyl mercaptan was changed to 0.3 parts. Evaluations were conducted in the same manner as in Example 1. The results are shown in Table 1.

Example 10

A slurry composition for lithium ion secondary battery negative electrode-use, a negative electrode for lithium ion secondary battery-use, a positive electrode for lithium ion secondary battery-use, and a lithium ion secondary battery were produced in the same way as in Example 1 with the exception that the third particulate polymer A was replaced with a third particulate polymer B. The third particulate polymer B was produced in the same way as the third particulate polymer A with the exception that the blending amount of butadiene was changed to 30 parts, the blending amount of t-dodecyl mercaptan was changed to 0.45 parts, and 3 parts of acrylonitrile was additionally blended as a vinyl cyanide-based monomer. Evaluations were conducted in the same manner as in Example 1. The results are shown in Table 1.

Example 11

A slurry composition for lithium ion secondary battery negative electrode-use, a negative electrode for lithium ion secondary battery-use, a positive electrode for lithium ion secondary battery-use, and a lithium ion secondary battery were produced in the same way as in Example 1 with the exception that the third particulate polymer A was replaced with a third particulate polymer C. The third particulate polymer C was produced in the same way as the third particulate polymer A with the exception that the blending amount of sodium dodecylbenzenesulfonate was changed to 0.3 parts. Evaluations were conducted in the same manner as in Example 1. The results are shown in Table 1.

Example 12

A slurry composition for lithium ion secondary battery negative electrode-use, a negative electrode for lithium ion secondary battery-use, a positive electrode for lithium ion secondary battery-use, and a lithium ion secondary battery were produced in the same way as in Example 1 with the exception that the third particulate polymer A was replaced with a third particulate polymer D. The third particulate polymer D was produced in the same way as the third particulate polymer A with the exception that the blending amount of sodium dodecylbenzenesulfonate was changed to 0.45 parts. Evaluations were conducted in the same manner as in Example 1. The results are shown in Table 1.

Examples 13 and 14

A slurry composition for lithium ion secondary battery negative electrode-use, a negative electrode for lithium ion secondary battery-use, a positive electrode for lithium ion secondary battery-use, and a lithium ion secondary battery were produced in the same way as in Example 1 with the exception that the first particulate polymer A, the second particulate polymer A, and the third particulate polymer A were used in the proportions shown in Table 1. Evaluations were conducted in the same manner as in Example 1. The results are shown in Table 1.

Comparative Example 1

A slurry composition for lithium ion secondary battery negative electrode-use, a negative electrode for lithium ion secondary battery-use, a positive electrode for lithium ion secondary battery-use, and a lithium ion secondary battery were produced in the same way as in Example 1 with the exception that the first particulate polymer A was replaced with a first particulate polymer E. The first particulate polymer E was produced in the same way as the first particulate polymer A with the exception that, in polymerization of the first polymer component, the blending amount of 1,3-butadiene was changed to 18 parts, the blending amount of acrylonitrile was changed to 32 parts, and the blending amount of t-dodecyl mercaptan was changed to 0.45 parts, and, in polymerization of the second polymer component, the blending amount of 1,3-butadiene was changed to 12 parts, the blending amount of styrene was changed to 9 parts, the blending amount of acrylonitrile was changed to 14 parts, and the blending amount of t-dodecyl mercaptan was changed to 0.5 parts. Evaluations were conducted in the same manner as in Example 1. The results are shown in Table 2.

Comparative Example 2

A slurry composition for lithium ion secondary battery negative electrode-use, a negative electrode for lithium ion secondary battery-use, a positive electrode for lithium ion secondary battery-use, and a lithium ion secondary battery were produced in the same way as in Comparative Example 1 with the exception that the third particulate polymer A was not used, and the first particulate polymer E and the second particulate polymer A were used in the proportions shown in Table 2. Evaluations were conducted in the same manner as in Example 1. The results are shown in Table 2.

Comparative Example 3

A slurry composition for lithium ion secondary battery negative electrode-use, a negative electrode for lithium ion secondary battery-use, a positive electrode for lithium ion secondary battery-use, and a lithium ion secondary battery were produced in the same way as in Example 1 with the exception that the first particulate polymer A was replaced with a first particulate polymer F. The first particulate polymer F was produced in the same way as the first particulate polymer A with the exception that, in polymerization of the first polymer component, the blending amount of 1,3-butadiene was changed to 38 parts, the blending amount of acrylonitrile was changed to 12 parts, and the blending amount of t-dodecyl mercaptan was changed to 0.15 parts, and, in polymerization of the second polymer component, the blending amount of styrene was changed to 16 parts, the blending amount of acrylonitrile was changed to 6 parts, and the blending amount of t-dodecyl mercaptan was changed to 0.2 parts. Evaluations were conducted in the same manner as in Example 1. The results are shown in Table 2.

Comparative Example 4

A slurry composition for lithium ion secondary battery negative electrode-use, a negative electrode for lithium ion secondary battery-use, a positive electrode for lithium ion secondary battery-use, and a lithium ion secondary battery were produced in the same way as in Example 1 with the exception that the first particulate polymer A was replaced with a first particulate polymer G. The first particulate polymer G was produced in the same way as the first particulate polymer A with the exception that, in polymerization of the first polymer component, the blending amount of 1,3-butadiene was changed to 18 parts, the blending amount of acrylonitrile was changed to 32 parts, the blending amount of t-dodecyl mercaptan was changed to 0.45 parts, and the blending amount of sodium dodecylbenzenesulfonate was changed to 2 parts, and, in polymerization of the second polymer component, the blending amount of 1,3-butadiene was changed to 12 parts, the blending amount of styrene was changed to 9 parts, the blending amount of acrylonitrile was changed to 14 parts, the blending amount of t-dodecyl mercaptan was changed to 0.5 parts, and the blending amount of the sodium dodecylbenzenesulfonate was changed to 4 parts. Evaluations were conducted in the same manner as in Example 1. The results are shown in Table 2.

Comparative Example 5

A slurry composition for lithium ion secondary battery negative electrode-use, a negative electrode for lithium ion secondary battery-use, a positive electrode for lithium ion secondary battery-use, and a lithium ion secondary battery were produced in the same way as in Example 1 with the exception that the second particulate polymer A was replaced with a second particulate polymer D. The second particulate polymer D was produced in the same way as the second particulate polymer A with the exception that the blending amount of butyl acrylate was changed to 92 parts, the blending amount of acrylonitrile was changed to 5 parts, and the blending amount of the t-dodecyl mercaptan was changed to 0.5 parts. Evaluations were conducted in the same manner as in Example 1. The results are shown in Table 2.

Comparative Example 6

A slurry composition for lithium ion secondary battery negative electrode-use, a negative electrode for lithium ion secondary battery-use, a positive electrode for lithium ion secondary battery-use, and a lithium ion secondary battery were produced in the same way as in Example 1 with the exception that the first particulate polymer A was replaced with the first particulate polymer G and the second particulate polymer A was replaced with a second particulate polymer E. The second particulate polymer E was produced in the same way as the second particulate polymer A with the exception that the blending amount of sodium dodecylbenzenesulfonate was changed to 0.5 parts. Evaluations were conducted in the same manner as in Example 1. The results are shown in Table 2.

Comparative Example 7

A slurry composition for lithium ion secondary battery negative electrode-use, a negative electrode for lithium ion secondary battery-use, a positive electrode for lithium ion secondary battery-use, and a lithium ion secondary battery were produced in the same way as in Example 1 with the exception that only the third particulate polymer A was used as the particulate binding material in the proportion shown in Table 2. Evaluations were conducted in the same manner as in Example 1. The results are shown in Table 2.

TABLE 1

| | | | Example 1 | Example 2 | Example 3 | Example 4 | Example 5 | Example 6 | Example 7 |
|---|---|---|---|---|---|---|---|---|---|
| Negative electrode active material [parts by mass] | | | 100 | 100 | 100 | 100 | 100 | 100 | 100 |
| Particulate binding material | First particulate polymer | Type | A | A | B | C | A | A | A |
| | | Degree of swelling in electrolysis solution [mass %] | 600 | 600 | 540 | 680 | 600 | 600 | 600 |
| | | Number average particle diameter [nm] | 110 | 110 | 120 | 115 | 110 | 110 | 110 |
| | | Gel content [mass %] | 85 | 85 | 88 | 81 | 85 | 85 | 85 |
| | | Blending amount [parts by mass] | 0.6 | 1.2 | 0.6 | 0.6 | 0.6 | 0.6 | 0.525 |
| | Second particulate polymer | Type | A | A | A | A | B | C | A |
| | | Degree of swelling in electrolysis solution [mass %] | 350 | 350 | 350 | 350 | 320 | 390 | 350 |
| | | Number average particle diameter [nm] | 350 | 350 | 350 | 350 | 350 | 400 | 350 |
| | | Gel content [mass %] | 90 | 90 | 90 | 90 | 92 | 85 | 90 |
| | | Blending amount [parts by mass] | 0.15 | 0.3 | 0.15 | 0.15 | 0.15 | 0.15 | 0.225 |
| | Third particulate polymer | Type | A | — | A | A | A | A | A |
| | | Degree of swelling in electrolysis solution [mass %] | 150 | — | 150 | 150 | 150 | 150 | 150 |
| | | Number average particle diameter [nm] | 150 | — | 150 | 150 | 150 | 150 | 150 |
| | | Gel content [mass %] | 93 | — | 93 | 93 | 93 | 93 | 93 |
| | | Blending amount [parts by mass] | 0.75 | 0 | 0.75 | 0.75 | 0.75 | 0.75 | 0.75 |
| | Particle diameter ratio (second particulate polymer/first particulate polymer) [—] | | 3.2 | 3.2 | 2.9 | 3.0 | 3.2 | 3.6 | 3.2 |
| | Blending ratio (first particulate polymer/(first particulate polymer + second particulate polymer)) [mass %] | | 80 | 80 | 80 | 80 | 80 | 80 | 70 |
| | Blending ratio (second particulate polymer/(first particulate polymer + second particulate polymer)) [mass %] | | 20 | 20 | 20 | 20 | 20 | 20 | 30 |
| | Blending ratio ((first particulate polymer + second particulate polymer)/particulate binding material) [mass %] | | 50 | 100 | 50 | 50 | 50 | 50 | 50 |
| | Blending ratio (third particulate polymer/particulate binding material) [mass %] | | 50 | 0 | 50 | 50 | 50 | 50 | 50 |
| Negative electrode production conditions | Drying temperature [° C. ] | | 70 | 70 | 70 | 70 | 70 | 70 | 70 |
| Evaluation | Peel strength | | A | B | A | B | A | A | A |
| | Amount of lithium deposition | | A | A | A | A | A | A | A |
| | Post-cycling expansion | | A | B | A | B | A | B | A |
| | Low-temperature output characteristics | | A | A | B | A | B | A | B |

| | | | Example 8 | Example 9 | Example 10 | Example 11 | Example 12 | Example 13 | Example 14 |
|---|---|---|---|---|---|---|---|---|---|
| Negative electrode active material [parts by mass] | | | 100 | 100 | 100 | 100 | 100 | 100 | 100 |
| Particulate binding material | First particulate polymer | Type | A | D | A | A | A | A | A |
| | | Degree of swelling in electrolysis solution [mass %] | 600 | 600 | 600 | 600 | 600 | 600 | 600 |
| | | Number average particle diameter [nm] | 110 | 85 | 110 | 110 | 110 | 110 | 110 |
| | | Gel content [mass %] | 85 | 88 | 85 | 85 | 85 | 85 | 85 |
| | | Blending amount [parts by mass] | 0.7125 | 0.6 | 0.6 | 0.6 | 0.6 | 0.42 | 0.78 |
| | Second particulate polymer | Type | A | A | A | A | A | A | A |
| | | Degree of swelling in electrolysis solution [mass %] | 350 | 350 | 350 | 350 | 350 | 350 | 350 |
| | | Number average particle diameter [nm] | 350 | 350 | 350 | 350 | 350 | 350 | 350 |
| | | Gel content [mass %] | 90 | 90 | 90 | 90 | 90 | 90 | 90 |
| | | Blending amount [parts by mass] | 0.0375 | 0.15 | 0.15 | 0.15 | 0.15 | 0.105 | 0.195 |

TABLE 1-continued

| | | | | | | | | |
|---|---|---|---|---|---|---|---|---|
| Third particulate polymer | Type | A | A | B | C | D | A | A |
| | Degree of swelling in electrolysis solution [mass %] | 150 | 150 | 240 | 150 | 150 | 150 | 150 |
| | Number average particle diameter [nm] | 150 | 150 | 150 | 190 | 140 | 150 | 150 |
| | Gel content [mass %] | 93 | 93 | 86 | 93 | 93 | 93 | 93 |
| | Blending amount [parts by mass] | 0.75 | 0.75 | 0.75 | 0.75 | 0.75 | 0.975 | 0.525 |
| | Particle diameter ratio (second particulate polymer/first particulate polymer) [—] | 3.2 | 4.1 | 3.2 | 3.2 | 3.2 | 3.2 | 3.2 |
| | Blending ratio (first particulate polymer/(first particulate polymer + second particulate polymer)) [mass %] | 95 | 80 | 80 | 80 | 80 | 80 | 80 |
| | Blending ratio (second particulate polymer/(first particulate polymer + second particulate polymer)) [mass %] | 5 | 20 | 20 | 20 | 20 | 20 | 20 |
| | Blending ratio ((first particulate polymer + second particulate polymer)/particulate binding material) [mass %] | 50 | 50 | 50 | 50 | 50 | 35 | 65 |
| | Blending ratio (third particulate polymer/particulate binding material) [mass %] | 50 | 50 | 50 | 50 | 50 | 65 | 35 |
| Negative electrode production conditions | Drying temperature [° C. ] | 70 | 70 | 70 | 70 | 70 | 70 | 70 |
| Evaluation | Peel strength | A | A | A | A | A | A | B |
| | Amount of lithium deposition | A | A | A | A | A | B | A |
| | Post-cycling expansion | B | A | B | A | A | A | A |
| | Low-temperature output characteristics | A | A | A | A | A | B | A |

TABLE 2

| | | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Negative electrode active material [parts by mass] | | | 100 | 100 | 100 | 100 | 100 | 100 | 100 |
| Particulate binding material | First particulate polymer | Type | E | E | F | G | A | G | — |
| | | Degree of swelling in electrolysis solution [mass %] | 800 | 800 | 400 | 800 | 600 | 800 | — |
| | | Number average particle diameter [nm] | 120 | 120 | 110 | 300 | 110 | 300 | — |
| | | Gel content [mass %] | 70 | 70 | 91 | 70 | 85 | 70 | — |
| | | Blending amount [parts by mass] | 0.6 | 1.2 | 0.6 | 0.6 | 0.6 | 0.6 | 0 |
| | Second particulate polymer | Type | A | A | A | A | D | E | — |
| | | Degree of swelling in electrolysis solution [mass %] | 350 | 350 | 350 | 350 | 500 | 350 | — |
| | | Number average particle diameter [nm] | 350 | 350 | 350 | 350 | 350 | 140 | — |
| | | Gel content [mass %] | 90 | 90 | 90 | 90 | 76 | 90 | — |
| | | Blending amount [parts by mass] | 0.15 | 0.3 | 0.15 | 0.15 | 0.15 | 0.15 | 0 |
| | Third particulate polymer | Type | A | — | A | A | A | A | A |
| | | Degree of swelling in electrolysis solution [mass %] | 150 | — | 150 | 150 | 150 | 150 | 150 |
| | | Number average particle diameter [nm] | 150 | — | 150 | 150 | 150 | 150 | 150 |
| | | Gel content [mass %] | 93 | — | 93 | 93 | 93 | 93 | 93 |
| | | Blending amount [parts by mass] | 0.75 | 0 | 0.75 | 0.75 | 0.75 | 0.75 | 1.5 |
| | | Particle diameter ratio (second particulate polymer/first particulate polymer) [—] | 2.9 | 2.9 | 3.2 | 1.2 | 3.2 | 0.5 | — |
| | | Blending ratio (first particulate polymer/(first particulate polymer + second particulate polymer)) [mass %] | 80 | 80 | 80 | 80 | 80 | 80 | — |
| | | Blending ratio (second particulate polymer/(first particulate polymer + second particulate polymer)) [mass %] | 20 | 20 | 20 | 20 | 20 | 20 | — |
| | | Blending ratio ((first particulate polymer + second particulate polymer)/particulate binding material) [mass %] | 50 | 100 | 50 | 50 | 50 | 50 | 0 |
| | | Blending ratio (third particulate polymer/particulate binding material) [mass %] | 50 | 0 | 50 | 50 | 50 | 50 | 100 |

TABLE 2-continued

| | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Negative electrode production conditions | Drying temperature [° C. ] | 70 | 70 | 70 | 70 | 70 | 70 | 70 |
| Evaluation | Peel strength | B | D | B | B | C | C | B |
| | Amount of lithium deposition | A | A | C | B | B | C | C |
| | Post-cycling expansion | D | D | B | D | D | D | B |
| | Low-temperature output characteristics | A | A | C | C | A | C | D |

Table 1 shows that in each of Examples 1-14 in which a first particulate polymer and a second particulate polymer having the prescribed properties were used, it was possible to obtain an electrode having excellent peel strength, and to improve low-temperature output characteristics of the lithium ion secondary battery while also inhibiting lithium deposition and suppressing electrode swelling.

In contrast, Table 2 shows that in each of Comparative Examples 1-6 in which the first particulate polymer and the second particulate polymer that were used did not have the prescribed properties, and in Comparative Example 7 in which only the third particulate polymer was used without using the first particulate polymer and the second particulate polymer, it was not possible to improve low-temperature output characteristics of the lithium ion secondary battery while inhibiting lithium deposition and suppressing electrode expansion.

In particular, Examples 1 and 2 in Table 1 demonstrate that electrode peel strength can be improved and electrode expansion can be further suppressed by using the third particulate polymer in addition to the first particulate polymer and the second particulate polymer.

Moreover, Examples 1, 3-6, and 10 in Table 1 demonstrate that inhibition of lithium deposition, suppression of electrode expansion, improvement of electrode peel strength, and improvement of lithium ion secondary battery low-temperature output characteristics can be achieved to high levels at the same time through adjustment of the degree of swelling in electrolyte solution of the particulate polymers and so forth.

Furthermore, Examples 1, 7, 8, 13, and 14 in Table 1 demonstrate that inhibition of lithium deposition, suppression of electrode expansion, improvement of electrode peel strength, and improvement of lithium ion secondary battery low-temperature output characteristics can be achieved to high levels at the same time through adjustment of the blending ratio of the particulate polymers.

Also, Examples 1, 9, 11, and 12 in Table 1 demonstrate that electrode peel strength and the like can be improved through adjustment of the number average particle diameters of the particulate polymers.

INDUSTRIAL APPLICABILITY

Through the presently disclosed binder composition for secondary battery electrode-use and the presently disclosed slurry composition for secondary battery electrode-use, it is possible to form a low-resistance electrode mixed material layer that enables a secondary battery to exhibit good low-temperature output characteristics and that inhibits deposition of lithium dendrites and the like, and it is also possible to favorably suppress electrode expansion that is associated with repeated charging and discharging.

Moreover, through the presently disclosed electrode for secondary battery-use and the presently disclosed method for producing an electrode for secondary battery-use, it is possible to provide an electrode that enables a secondary battery to exhibit good low-temperature output characteristics, that inhibits deposition of lithium dendrites and the like, and that has a low tendency to expand even when charging and discharging are performed repeatedly.

Furthermore, the presently disclosed secondary battery has excellent low-temperature output characteristics and has a low tendency to experience electrode expansion or deposition of lithium dendrites or the like on an electrode.

The invention claimed is:

1. A binder composition for secondary battery electrode-use comprising a particulate binding material and water, wherein the particulate binding material includes a first particulate polymer having a degree of swelling of at least 450 mass % and no greater than 700 mass % and containing an aliphatic conjugated diene monomer unit and an aromatic vinyl monomer unit, and a second particulate polymer having a degree of swelling of at least 300 mass % and no greater than 400 mass % and containing a (meth)acrylic acid ester monomer unit, wherein the degree of swelling is measured using an electrolyte solution obtained by dissolving $LiPF_6$ with a concentration of 1.0 M in a mixed solvent of ethylene carbonate and ethyl methyl carbonate with a volume ratio of 3/7 and vinylene carbonate with a solvent ratio of 2 mass %.

2. The binder composition for secondary battery electrode-use of claim 1, wherein a ratio of a number average particle diameter of the second particulate polymer relative to a number average particle diameter of the first particulate polymer is at least 1.8 and no greater than 4.4.

3. The binder composition for secondary battery electrode-use of claim 1, wherein the first particulate polymer is contained in an amount, expressed as a solid content-converted value, of at least 70 parts by mass and no greater than 95 parts by mass per a total of 100 parts by mass of the first particulate polymer and the second particulate polymer.

4. The binder composition for secondary battery electrode-use of claim 1, wherein the particulate binding material further includes a third particulate polymer having a degree of swelling of at least 130 mass % and no greater than 250 mass %, wherein the degree of swelling is measured using an electrolyte solution obtained by dissolving $LiPF_6$ with a concentration of 1.0 M in a mixed solvent of ethylene carbonate and ethyl methyl carbonate with a volume ratio of 3/7 and vinylene carbonate with a solvent ratio of 2 mass %.

5. The binder composition for secondary battery electrode-use of claim 4, wherein the third particulate polymer has a larger number average particle diameter than the first particulate polymer and a smaller number average particle diameter than the second particulate polymer.

6. The binder composition for secondary battery electrode-use of claim 4, wherein the first particulate polymer and the second particulate polymer are contained in a total amount, expressed as a solid content-converted value, of at least 30 parts by mass and no greater than 70 parts by mass per 100 parts by mass of the particulate binding material, and the third particulate polymer is contained in an amount, expressed as a solid content-converted value, of at least 30 parts by mass and no greater than 70 parts by mass per 100 parts by mass of the particulate binding material.

7. A slurry composition for secondary battery electrode-use comprising:

the binder composition for secondary battery electrode-use of claim 1; and an electrode active material.

8. An electrode for secondary battery-use comprising an electrode mixed material layer that is obtainable using the slurry composition for secondary battery electrode-use of claim 7.

9. A method for producing an electrode for secondary battery-use, comprising:

applying the slurry composition for secondary battery electrode-use of claim 7 onto a current collector; and drying the slurry composition for secondary battery electrode-use that has been applied onto the current collector to form an electrode mixed material layer on the current collector, wherein the drying of the slurry composition for secondary battery electrode-use is performed at a temperature of 70° C. or higher.

10. A secondary battery comprising a positive electrode, a negative electrode, a separator, and an electrolyte solution, wherein either or both of the positive electrode and the negative electrode are the electrode for secondary battery-use of claim 8.

11. The binder composition for secondary battery electrode-use of claim 1, wherein a percentage content of the (meth)acrylic acid ester monomer unit is at least 80 mass %.

* * * * *